US008193289B2

(12) United States Patent
Abhari et al.

(10) Patent No.: US 8,193,289 B2
(45) Date of Patent: *Jun. 5, 2012

(54) POLYOLEFIN ADHESIVE COMPOSITIONS AND ARTICLES MADE THEREFROM

(75) Inventors: Ramin Abhari, Bixby, OK (US); Charles Lewis Sims, Houston, TX (US); Kenneth Lewtas, Tervuren (BE); Mun Fu Tse, Seabrook, TX (US); Patrick Brant, Seabrook, TX (US); Peijun Jiang, League City, TX (US); Wai Yan Chow, Sugarland, TX (US); Jean-Roch Schauder, Wavre (BE); Caiguo Gong, Pearland, TX (US); David Raymond Johnsrud, Humble, TX (US); Jo Ann Marie Canich, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/624,697

(22) Filed: Nov. 24, 2009

(65) Prior Publication Data

US 2010/0076128 A1 Mar. 25, 2010

Related U.S. Application Data

(63) Continuation of application No. 10/825,348, filed on Apr. 15, 2004, now Pat. No. 7,700,707, which is a continuation-in-part of application No. 10/686,951, filed on Oct. 15, 2003, now Pat. No. 7,524,910, which is a continuation-in-part of application No. 10/687,508, filed on Oct. 15, 2003, now Pat. No. 7,294,681.

(60) Provisional application No. 60/418,482, filed on Oct. 15, 2002, provisional application No. 60/460,714, filed on Apr. 4, 2003.

(51) Int. Cl.
C08F 210/00 (2006.01)

(52) U.S. Cl. ......... 526/348; 524/570; 524/582; 526/351

(58) Field of Classification Search .................. 523/348; 526/348, 351; 524/570, 582
See application file for complete search history.

(56) References Cited

U.S. PATENT DOCUMENTS

| | | | |
|---|---|---|---|
| 3,821,143 A | 6/1974 | Cluff et al. | |
| 3,987,122 A | 10/1976 | Bartz et al. | |
| 4,120,916 A | 10/1978 | Meyer, Jr. et al. | |
| 4,210,570 A | 7/1980 | Trotter et al. | |
| 5,075,386 A | 12/1991 | Vanderbilt | |
| 5,231,126 A | 7/1993 | Shi et al. | |
| 5,317,070 A | 5/1994 | Brant et al. | |
| 5,326,639 A | 7/1994 | Leonard et al. | |
| 5,455,111 A | 10/1995 | Velasquez Urey | |
| 5,468,807 A | 11/1995 | Tsurutani et al. | |
| 5,516,848 A | 5/1996 | Canich et al. | |
| 5,530,054 A | 6/1996 | Tse et al. | |
| 5,539,056 A | 7/1996 | Yang et al. | |
| 5,548,014 A | 8/1996 | Tse et al. | |
| 5,874,512 A | 2/1999 | Farley et al. | |
| 5,986,009 A | 11/1999 | Thoen et al. | |
| 5,998,039 A | 12/1999 | Tanizaki et al. | |
| 6,143,825 A | 11/2000 | Beren et al. | |
| 6,143,846 A | 11/2000 | Herrmann et al. | |
| 6,184,327 B1 | 2/2001 | Weng et al. | |
| 6,214,447 B1 | 4/2001 | Nakagawa et al. | |
| 6,248,832 B1 | 6/2001 | Peacock | |
| 6,323,284 B1 | 11/2001 | Peacock | |
| 6,342,574 B1 | 1/2002 | Weng et al. | |
| 6,391,974 B1 | 5/2002 | Ogawa et al. | |
| 6,407,171 B1 | 6/2002 | Agarwal et al. | |
| 6,486,246 B1 | 11/2002 | Vion | |
| 6,500,563 B1 | 12/2002 | Datta et al. | |
| 6,573,350 B1 | 6/2003 | Markel et al. | |
| 6,573,352 B1 | 6/2003 | Tatsumi et al. | |
| 6,627,723 B2 | 9/2003 | Karandinos et al. | |
| 6,639,020 B1 | 10/2003 | Brant | |
| 6,657,009 B2 | 12/2003 | Zhou | |
| 6,659,965 B1 | 12/2003 | Kensey et al. | |
| 6,660,809 B1 | 12/2003 | Weng et al. | |

(Continued)

FOREIGN PATENT DOCUMENTS

| | | |
|---|---|---|
| EP | 0 442 245 | 8/1991 |
| GB | 1 325 484 | 8/1973 |
| GB | 1991/07472 | 5/1991 |
| WO | 95/10575 | 4/1995 |
| WO | 96/23838 | 8/1996 |
| WO | 97/15636 | 5/1997 |
| WO | 98/10016 | 3/1998 |

(Continued)

OTHER PUBLICATIONS

Britovsek et al., "*Iron Catalyzed Polyethylene Chain Growth on Zinc: A Study of the Factors Delineating Chain Transfer versus Catalyzed Chain Growth in Zinc and Related Metal Alkyl Systems*", Journal of American Chemical Society, 2004, vol. 126, pp. 10701-10712.

*Primary Examiner* — Edward Cain

(57) ABSTRACT

Embodiments of the present invention relate to article comprising 1) a functionalized component, 2) tackifier, and 3) an olefin polymer comprising one or more C3 to C40 olefins, optionally one or more diolefins, and less than 5 mole % of ethylene having a Dot T-Peel of 1 Newton or more, a branching index (g') of 0.95 or less measured at the Mz of the polymer; and an Mw of 100,000 or less; where the functional component is selected from the group consisting of functionalized polymers, functionalized oligomers and beta nucleating agents; and where the Gardner color of the adhesive does not change by more than 7 Gardner units when the adhesive has been heat aged at 180° C. for 48 hours as compared to the Gardner color of the unaged composition.

20 Claims, No Drawings

U.S. PATENT DOCUMENTS

| | | |
|---|---|---|
| 6,800,700 B2 | 10/2004 | Sun |
| 6,887,941 B2 | 5/2005 | Zhou |
| 7,294,681 B2 | 11/2007 | Jiang et al. |
| 7,524,910 B2 * | 4/2009 | Jiang et al. .................. 526/348 |
| 7,700,707 B2 * | 4/2010 | Abhari et al. ................. 526/348 |
| 2001/0007896 A1 | 7/2001 | Agarwal et al. |
| 2001/0044506 A1 | 11/2001 | Mehta et al. |
| 2001/0049331 A1 | 12/2001 | Chang |
| 2002/0007033 A1 | 1/2002 | Karandinos et al. |
| 2002/0019507 A1 | 2/2002 | Karandinos et al. |
| 2002/0123538 A1 | 9/2002 | Zhou et al. |
| 2002/0124956 A1 | 9/2002 | Zhou |
| 2003/0065097 A1 | 4/2003 | DeGroot et al. |
| 2003/0078350 A1 | 4/2003 | Weng et al. |
| 2003/0092844 A1 | 5/2003 | Pradel |
| 2004/0023037 A1 | 2/2004 | Baumert et al. |
| 2004/0038058 A1 | 2/2004 | Zhou |
| 2004/0039117 A1 | 2/2004 | Kijima |
| 2004/0046214 A1 | 3/2004 | Ishigaki et al. |
| 2004/0048984 A1 | 3/2004 | Weng et al. |
| 2004/0054086 A1 | 3/2004 | Schauder et al. |

FOREIGN PATENT DOCUMENTS

| | | |
|---|---|---|
| WO | 98/34970 | 8/1998 |
| WO | 00/01745 | 1/2000 |
| WO | 00/37514 | 6/2000 |
| WO | 01/42351 | 6/2001 |
| WO | 01/46277 | 6/2001 |
| WO | 02/051931 | 7/2002 |
| WO | 03/033612 | 4/2003 |

* cited by examiner

POLYOLEFIN ADHESIVE COMPOSITIONS AND ARTICLES MADE THEREFROM

This application is a continuation of U.S. Ser. No. 10/825,348, filed Apr. 15, 2004 now U.S. Pat. No. 7,700,707 which is a continuation-in-part of U.S. Ser. No. 10/686,951, filed Oct. 15, 2003 now U.S. Pat. No. 7,524,910 which claims priority from U.S. Ser. No. 60/418,482, filed Oct. 15, 2002 and U.S. Ser. No. 60/460,714, filed Apr. 4, 2003 which is also a continuation-in-part of U.S. Ser. No. 10/687,508, filed Oct. 15, 2003 now U.S. Pat. No. 7,294,681 which claims priority from U.S. Ser. No. 60/418,482, filed Oct. 15, 2002 and U.S. Ser. No. 60/460,714, filed Apr. 4, 2003.

This application is related to: 1) U.S. Ser. No. 60/199,093 filed on Apr. 21, 2000, 2) U.S. Ser. No. 60/171,715 filed Dec. 21, 1999, 3) U.S. Ser. No. 09/745,394 filed Dec. 21, 2000, 4) U.S. Ser. No. 09/746,332 filed Dec. 21, 2000, and 5) WO 01/81493 published Nov. 1, 2001.

FIELD OF THE INVENTION

This invention relates to adhesives comprising: 1) functionalized component 2) olefin polymers of $C_{3-40}$ olefins having a Dot T-Peel of 1 Newton or more, a branching index (g') of 0.95 or less measured at the z-average molecular weight (Mz) of the polymer, a weight average molecular weight (Mw) of 100,000 or less or a branching index (g') of 0.98 or less measured at the z-average molecular weight (Mz) of the polymer, a weight average molecular weight (Mw) of 30,000 or less, where the functionalized component is selected from the group consisting of functionalized components, functionalized oligomers and beta nucleating agents; and where the Gardner color of the adhesive does not change by more than 7 Gardner units when the adhesive has been heat aged at 180° C. for 48 hours as compared to the Gardner color of the unaged composition.

BACKGROUND OF THE INVENTION

There is a need in the art for adhesives that are heat stable and low in color. This invention provides such an adhesive, particular one that provides high and low temperature performance.

SUMMARY OF THE INVENTION

This invention relates to adhesives comprising 1) functionalized component and 2) an olefin polymer comprising one or more C3 to C40 olefins where the olefin polymer has:
 a) a Dot T-Peel of 1 Newton or more on Kraft paper; a branching index (g') of 0.95 or less measured at the Mz of the polymer; a Mw of 10,000 to 100,000; and
a heat of fusion of 1 to 70 J/g;
where the functional component is selected from the group consisting of functionalized polymers, functionalized oligomers and beta nucleating agents; and
where the Gardner color of the adhesive does not change by more than 7 Gardner units when the adhesive has been heat aged at 180° C. for 48 hours as compared to the Gardner color of the unaged composition.

This invention relates to adhesives comprising 1) functionalized component and 2) an olefin polymer comprising one or more C3 to C40 olefins where the olefin polymer has:
 a) a Dot T-Peel of 1 Newton or more on Kraft paper;
 b) a branching index (g') of 0.98 or less measured at the Mz of the polymer;
 c) a Mw of 10,000 to 60,000;
 d) a heat of fusion of 1 to 50 J/g;
where the functional component is selected from the group consisting of functionalized polymers, functionalized oligomers and beta nucleating agents; and where the Gardner color of the adhesive does not change by more than 7 Gardner units when the adhesive has been heat aged at 180° C. for 48 hours as compared to the Gardner color of the unaged composition.

DETAILED DESCRIPTION

By "functionalized polymer" is meant that the polymer is contacted with a functional group, and optionally a catalyst, heat, initiator, or free radical source to cause all or part of the functional group to incorporate, graft, bond to, physically attach to, and or chemically attach to the polymer. In addition, "functionalized component" is also defined to include polymer directly polymerized from monomers (or using initiatior having a functional group) where the polymer has a functional group at a chain end.

By "functionalized oligomer" is meant that the oligomer is contacted with a functional group, and optionally a catalyst, heat, initiator, or free radical source to cause all or part of the functional group to incorporate, graft, bond to, physically attach to, and or chemically attach to the oligomer. In addition, "functionalized oligomer" is also defined to include polymer directly oligomerized from monomers (or using initiatior having a functional group) where the oligomer has a functional group at a chain end.

By "functional group" is meant any compound with a weight average molecular weight of 1000 or less that contains a heteroatom and or an unsaturation. Preferably the functional group is a compound containing a heteroatom, such as maleic anhydride. Preferred functional groups include organic acids, organic amides, organic amines, organic esters, organic anhydrides, organic alcohols, organic acid halides (such as acid chlorides, acid bromides, etc.) organic peroxides, and salts thereof.

For purposes of this disclosure, the term oligomer refers to compositions having 2-40 mer units and the term polymer refers to compositions having 41 or more mer units. A mer is defined as a unit of an oligomer or polymer that originally corresponded to the monomer(s) used in the oligomerization or polymerization reaction. For example, the mer of polyethylene would be ethylene.

For purposes of this invention, beta nucleating agents are defined to be materials that cause at least 5% beta crystallization of the crystallization that occurs (Kvalue of 0.05 or more) in the composition as measured by the following procedure:

Determination of beta-form crystal content by X-ray method:

A sample of the adhesive is subjected to X-ray diffraction and a K value is obtained by the following equation:

$$K\text{value}=(Hb1) \text{ divided by } (Hb1+Ha1,+Ha2+Ha3),$$

where:
Hb1 is a reflection intensity (height) on (300) plane of beta-form crystal;
Ha1 is a reflection intensity (height) on (110) plane of alpha-form crystal;
Ha2 is a reflection intensity (height) on (040) plane of alpha-form crystal; and
Ha3 is a reflection intensity (height) on (130) plane of alpha-form crystal.

In a preferred embodiment the adhesives prepared herein have a Kvalue of 0.05 or more, preferably 0.10 or more, preferably 0.15 or more, preferably 0.20 or more, preferably 0.25 or more, preferably 0.30 or more, preferably 0.35 or more, preferably 0.40 or more, preferably 0.45 or more, preferably 0.50 or more, preferably 0.55 or more, preferably 0.60 or more, preferably 0.65 or more, preferably 0.70 or more, preferably 0.75 or more, preferably 0.80 or more, preferably 0.85 or more, preferably 0.90 or more, preferably 0.95 or more, preferably 1.0.

For the purposes of this invention and the claims thereto and for ease of reference when a polymer is referred to as comprising an olefin, the olefin present in the polymer is the polymerized form of the olefin. For ease of reference amorphous polypropylene is abbreviated aPP, isotactic polypropylene is abbreviated iPP, syndiotactic polypropylene is abbreviated sPP, semi-crystalline polypropylene is abbreviated scPP, and "-g-" indicates that the components are grafted.

In a preferred embodiment the functionalized component is present at 0.005 to 99 weight %, preferably 0.01 weight % to 99 weight %, preferably 0.05 to 90 weight %, preferably between 0.1 and 75 weight %, more preferably between 0.5 and 60 weight %, more preferably between 1 and 50%, more preferably between 1.5 and 40 weight %, more preferably between 2 and 30%, more preferably between 2 and 20 weight %, more preferably between 2 and 15%, more preferably between 2 and 10%, more preferably between 2 and 5%, based upon the weight of the blend. Preferably the functionalized component is present at 0.005 to 10 weight %, more preferably 0.01 to 10 weight %, based upon the weight of the blend.

erably between 85 and 98 wt %, more preferably between 90 and 98 wt %, more preferably between 95 and 98%, based upon the weight of the blend.

In a preferred embodiment, this invention relates to adhesives comprising 1) functionalized component and 2) a homopolypropylene or a copolymer of propylene and up to 5 mole % ethylene having:

a) an isotactic run length of 1 to 30 (isotactic run length "IRL" is defined to be the percent of mmmm pentad divided by 0.5× percent of mmmr pentad) as determined by Carbon 13 NMR, preferably 3 to 25, more preferably 4 to 20, b) a percent of r dyad of greater than 20%, preferably from 20 to 70% as determined by Carbon 13 NMR, and c) a heat of fusion of 70 J/g or less, preferably 60 J/g or less, more preferably between 1 and 55 J/g, more preferably between 4 and 50 J/g.

In another embodiment this invention relates to adhesives comprising 1) functionalized component and 2) an olefin polymer comprising one or more C3 to C40 olefins, preferably propylene, and, in some embodiments, less than 15 mole % of ethylene (preferably less than 5 mole % ethylene), having:

a) a Dot T-Peel between 1 Newton and the 10,000 Newtons on kraft paper;

b) a Mz/Mn of 2 to 200; and c) an Mw of X and a g' of Y (measured at the Mz of the polymer) according to the following Table C:

TABLE C

| X (Mw) | Y (g') |
| --- | --- |
| 100,000 or less, preferably 80,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments X is also at least 7000, more preferably 10,000, more preferably at least 15,000. | 0.9 or less, preferably 0.7 or less Preferably between 0.5-0.9 |
| 75,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.92 or less, preferably, 0.6 or less preferably between 0.4-0.6- |
| 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.95 or less, preferably 0.7 or less preferably between 0.5-0.7- |
| 30,000 or less, preferably 25,000 or less, more preferably 20,000 or less, more preferably 15,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.98 or less preferably between 0.7-0.98 |

In a preferred embodiment, the C3 to C40 Olefin polymer is present in the adhesive blend at 1 to 99.005 weight %, preferably 1 weight % to 99.09 weight %, preferably 10 to 99.05 weight %, preferably between 25 and 99.9 weight %, more preferably between 40 and 99.5 weight %, more preferably between 50 and 99 weight %, more preferably between 60 and 98.5 weight %, more preferably between 70 and 98 wt %, more preferably between 80 and 98 weight %, more pref- C3 to C40 Olefin Polymers Preferred olefin polymers (also called "POA's" or "POA polymers") useful in this invention are those described in U.S. Ser. No. 10/686,951, filed Oct. 15, 2003 and U.S. Ser. No. 10/687,508, filed Oct. 15, 2003, which are incorporated by reference herein. In particular, pages 23 to 91 of U.S. Ser. No. 10/686,951 and pages 22 to 168 of U.S. Ser. No. 10/687,508 provide specific instruction on how to produce the olefin polymers useful herein. In general preferred POA's comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of amorphous polypropylene present in the POA polymer is grafted to isotactic polypropylene, represented herein as (aPP-g-IPP) and/or such that an amount of isotactic polypropylene present in the POA polymer is grafted to amorphous polypropylene, represented herein as (iPP-g-aPP).

In another embodiment, when Mw of the POA is between 15,000 and 100,000, then the $g'<(10^{-12} Mw^2-10^{-6} Mw+1.0178)$.

In a some embodiments the g' of the POA is 0.9 or less, 0.8 or less, 0.7 or less, 0.6 or less, measured at the Mz of the polymer.

In another embodiment the POA has a peak melting point (Tm) between 40 and 250° C., or between 60 and 190° C., or between about 60 and 150° C., or between 80 and 130° C. In some embodiments the peak melting point is between 60 and 160° C. In other embodiments the peak melting point is between 124-140° C. In other embodiments the peak melting temperature is between 40-130° C.

In another embodiment the POA has a viscosity (also referred to a Brookfield Viscosity or Melt Viscosity) of 90,000 mPa·sec or less at 190° C. (as measured by ASTM D 3236 at 190° C.; ASTM=American Society for Testing and Materials); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the viscosity is 50,000 mPa·sec or less depending on the applications.

In another embodiment the POA has a heat of fusion of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g.

In another embodiment the POA also has a Shore A Hardness (as measured by ASTM 2240) of 95 or less, 70 or less, or 60 or less, or 50 or less, or 40 or less or 30 or less, or 20 or less. In other embodiments the Shore A Hardness is 5 or more, 10 or more, or 15 or more. In certain applications, such as packaging, the Shore A Hardness is preferably 50-85. In another embodiment, the polymer has a Shore A hardness of 20-90.

In another embodiment the POA has an Mz/Mn of 2 to 200, preferably 2 to 150, preferably 10 to 100.

In another embodiment the POA has a Shear Adhesion Fail Temperature (SAFT—as measured by ASTM 4498) of 200° C. or less, or of 40 to 150° C., or 60 to 130° C., or 65 to 110° C., or 70-80° C. In certain embodiments SAFT's of 130-140° C. are preferred. In other embodiments, SAFT's of 100-130° C. are preferred. In other embodiments, SAFT's of 110-140° C. are preferred.

In another embodiment the POA also has a Dot T-Peel on Kraft paper of between 1 Newton and 10,000 Newtons, or 3 and 4000 Newtons, or between 5 and 3000 Newtons, or between 10 and 2000 Newtons, or between 15 and 1000 Newtons. Dot T-Peel is determined according to ASTM D 1876, as described below.

In another embodiment the POA has a set time of several days to 1 second, or 60 seconds or less, or 30 seconds or less, or 20 seconds or less, or 15 seconds or less, or 10 seconds or less, or 5 seconds or less, or 4 seconds or less, or 3 seconds or less, or 2 seconds or less, or 1 second or less.

In another embodiment the POA has an Mw/Mn of 2 to 75, or 4 to 60, or 5 to 50, or 6 to 20.

In another embodiment the POA has an Mz of 1,000,000 or less, preferably 15,000 to 1,000,000, or 20,000 to 800,000, or 25,000 to 350,000.

In another embodiment the POA has a strain at break (as measured by ASTM D-1708 at 25° C.) of 50 to 1000%, preferably 80 to 200%. In some other embodiments the strain at break is 100 to 500%.

In another embodiment, the POA has a tensile strength at break (as measured by ASTM D-1708 at 25° C.) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

In another embodiment the POA has a crystallization point (Tc) between 20 and 110° C. In some embodiments the Tc is between 70 to 100° C. In other embodiments the Tc is between 30 to 80° C. In other embodiments the Tc is between 20 to 50° C.

In some embodiment the POA has a slope of −0.1 or less, preferably −0.15 or less, more preferably −0.25 or less in the trace of complex viscosity versus temperature as shown in FIG. 1 (as measured by ARES dynamic mechanical spectrometer operating at a frequency of 10 rad/s, with a strain of 20% under a nitrogen atmosphere, and a cooling rate of 10° C./min) over the range of temperatures from Tc+10° C. to Tc+40° C. The slope is defined as a derivative of log (complex viscosity) with respect to temperature.

In another embodiment the POA has a Tc that is at least 10° C. below the Tm, preferably at least 20° C. below the Tm, preferably at least 30° C. below the Tm, more preferably at least 35° C. below the Tm.

In another embodiment some olefin POA's have a melt index ratio ($I_{10}/I_2$) of 6.5 or less, preferably 6.0 or less, preferably 5.5 or less, preferably 5.0 or less, preferably 4.5 or less, preferably between 1 and 6.0. ($I_{10}$ and $I_2$ are measured according to ASTM 1238 D, 2.16 kg, 190° C.).

In another embodiment some olefin POA's have a melt index (as determined by ASTM 1238 D, 2.16 kg, 190 deg. C.) of 25 dg/min or more, preferably 50 dg/min or more, preferably 100 dg/min or more, more preferably 200dg/min or more, more preferably 500 dg/mn or more, more preferably 2000 dg/min or more.

In another embodiment the POA has a range of crystallization of 10 to 60° C. wide, preferably 20 to 50° C., preferably 30 to 45° C. in the DSC traces. In DSC traces where there are two or more non-overlapping peaks, then each peak has a range of crystallization of 10 to 60° C. wide, preferably 20 to 50° C., preferably 30 to 45° C. in the DSC traces.

In another embodiment the POA has a molecular weight distribution (Mw/Mn) of at least 2, preferably at least 5, preferably at least 10, even more preferably at least 20.

In another embodiment the POA may have a unimodal, bimodal, or multimodal molecular weight distribution (Mw/Mn) distribution of polymer species as determined by Size Exclusion Chromatography (SEC). By bimodal or multimodal is meant that the SEC trace has more than one peak or inflection points. An inflection point is that point where the second derivative of the curve changes in sign (e.g., from negative to positive or vice versus).

In another embodiment the POA has an Energy of activation of 8 to 15 cal/mol. Energy of activation was calculated using the relationships of complex viscosity and temperature over the region where thermal effects are responsible for viscosity increase (assuming an Arrhenius-like relationship).

In another embodiment the POA's have a cloud point of 200° C. or less, preferably 180° C. or less, preferably 160° C. or less, preferably 120° C. or less, preferably 100° C. or less. Likewise any composition that the POA is part of preferably has a cloud point of 200° C. or less, preferably 180° C. or less, preferably 160° C. or less, preferably 120° C. or less, preferably 100° C. or less.

In another embodiment the POA may also have one or more of the following:
a) a peak melting point between 30 and 190° C., or between about 60 and 150° C., or between 80 and 130° C.; and/or
b) a viscosity of 8000 mPa·sec or less at 190° C. (as measured by ASTM D 3236 at 190° C.); or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec; and/or
c) an $H_f$ (Heat of fusion) of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 10 and 50 J/g; and or
d) a Shore A Hardness (as measured by ASTM 2240) of 90 or less, or 60 or less, or 50 or less, or 40 or less or 30 or less, or 20 or less; and or
e) a Shear Adhesion Fail Temperature (SAFT—as measured by ASTM 4498) of 40 to 150° C., or 60 to 130° C., or 65 to 110° C., or 70-80° C.; and or;
f) a Dot T-Peel of between 1 Newton and 10,000 Newtons, or 3 and 4000 Newtons, or between 5 and 3000 Newtons, or between 10 and 2000 Newtons, or between 15 and 1000 Newtons; and/or
g) a set time of several days to 0.1 second, or 60 seconds or less, or 30 seconds or less, or 20 seconds or less, or 15 seconds or less, or 10 seconds or less, or 5 seconds or less, or 4 seconds or less, or 3 seconds or less, or 2 seconds or less, or 1 second or less; and/or
h) an Mw/Mn of greater than 1 to 75, or 2 to 60, or 2 to 50, or 3 to 20; and/or
i) an Mz of 500,000 or less, preferably 15,000 to 500,000, or 20,000 to 400,000, or 25,000 to 350,000.

Useful combinations of features include POA's having a Dot T-Peel of between 1 Newton and 10,000 Newtons, or 3 and 4000 Newtons, or between 5 and 3000 Newtons, or between 10 and 2000 Newtons, or between 15 and 1000 Newtons and:
1) an Mw of 30,000 or less, a peak melting point between 60 and 190° C., a Heat of fusion of 1 to 70 J/g, a branching index (g') of 0.90 or less measured at the Mz of the polymer; and a melt viscosity of 8000 mPa·sec or less at 190° C.; or
2) an Mz of 20,000 to 5,000,000 and a SAFT of 60 to 150° C.; or
3) an Mz/Mn of 2-200 and a set time of 4 seconds or less; or
4) an $H_f$ (heat of fusion) of 20 to 50 J/g, an Mz or 20,000-500,000 and a shore hardness of 50 or less; or
5) an Mw/Mn of greater than 1 to 50, a viscosity of 5000 or less mPa·sec at 190° C.; or
6) an Mw of 50,000 or less, a peak melting point between 60 and 190° C., a heat of fusion of 2 to 70 J/g, a branching index (g') of 0.70 or less measured at the Mz of the polymer, and a melt viscosity of 8000 mPa·sec or less at 190° C.

In a preferred embodiment, the POA comprises amorphous, crystalline and branch-block molecular structures.

In a preferred embodiment the POA comprises at least 50 weight % propylene, preferably at least 60% propylene, alternatively at least 70% propylene, alternatively at least 80% propylene.

In another embodiment the POA has a glass transition temperature (Tg) as measured by ASTM E 1356 of 5° C. or less, preferably 0° C. or less, alternatively between 0° C. and −40° C., alternatively between −5° C. and −15° C.

In another embodiment the POA has an amorphous content of at least 50%, alternatively at least 60%, alternatively at least 70%, even alternatively between 50 and 99%. Percent amorphous content is determined by subtracting the percent crystallinity from 100. Percent crystallinity content is determined using Differential Scanning Calorimetry measurement according to ASTM E 794-85.

In another embodiment the POA has a crystallinity of 40% or less, alternatively 30% or less, alternatively 20% or less, even alternatively between 10% and 30%. Percent crystallinity content is determined using Differential Scanning Calorimetry measurement according to ASTM E 794-85. In another embodiment, the polymers described herein have a percent crystallinity of between 5 and 40%, alternatively between 10 to 30%.

In another embodiment the POA has a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less. Molecular weight distribution generally depends on the catalysts used and process conditions such as temperature, monomer concentration, catalyst ratio, if multiple catalysts are used, and the presence or absence of hydrogen. Hydrogen may be used at amounts up to 2 weight %, but is preferably used at levels of 50 to 500 ppm.

In another embodiment the POA is found to have at least two molecular weights fractions are present at greater than 2 weight %, preferably greater than 20 weight %, each based upon the weight of the polymer as measured by Gel Permeation Chromatography. The fractions can be identified on the GPC trace by observing two distinct populations of molecular weights. An example would be a GPC trace showing a peak at 20,000 Mw and another peak at 50,000 Mw where the area under the first peak represents more than 2 weight % of the polymer and the area under the second peak represents more than 2 weight % of the polymer.

In another embodiment the POA has 20 weight % or more (based upon the weight of the starting polymer) of hexane room temperature soluble fraction, and 70 weight % or less, preferably 50 weight % or less of Soxhlet boiling heptane insoluble, based upon the weight of the polymer. Soxhlet heptane insoluble refers to one of the fractions obtained when a sample is fractionated using successive solvent extraction technique. The fractionations are carried out in two steps: one involves room temperature solvent extraction, the other soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insoluble and the thimble from the final stage are air-dried in a hood to evaporate most of the solvent, then dried in a nitrogen-purged vacuum oven. The amount of insoluble left in the thimble is then calculated, provided the tare weight of the thimble is known.

In another embodiment, the POA's have a heptane insoluble fraction 70 weight % or less, based upon the weight of the starting polymer, and the heptane insoluble fraction has branching index g' of 0.9 (preferably 0.7) or less as measured at the Mz of the polymer. In a preferred embodiment the POA's also have at least 20 weight % hexane soluble fraction, based upon the weight of the starting polymer. In another embodiment, the POA's have a heptane insoluble fraction 70 weight % or less, based upon the weight of the starting polymer and a Mz between 20,000 and 5000,000 of the heptane insoluble portion. In a preferred embodiment the POA's also have at least 20 weight % hexane soluble fraction, based upon the weight of the starting polymer. In another embodiment the POA's have a hexane soluble portion of at least 20 weight %, based upon the weight of the starting polymer.

In another embodiment the POA comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the POA comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

For ease of reference the polymer produced by the second catalyst having at least 20% crystallinity may also be referred to as the "semi-crystalline polymer" and the polymer produced by the first catalyst component having a crystallinity of less than 5% may be referred to as the "amorphous polymer."

In another embodiment of this invention the POA's have a characteristic three-zone complex viscosity-temperature pattern, as shown in FIG. 1. The temperature dependence of complex viscosity was measured using ARES dynamic mechanical spectrometer operating at a frequency of 10 rad/s, with a strain of 20% under a nitrogen atmosphere, and a cooling rate of 10° C./min. The sample was first molten then gradually cooled down to room temperature while monitoring the build-up in complex viscosity. Above the melting point, which is typical of polymer processing temperature, the complex viscosity is relatively low (Zone I) and increases gradually with decreasing temperature. In zone II, a sharp increase in complex viscosity appears as temperature is dropped. The third zone (Zone III) is the high complex viscosity zone, which appears at lower temperatures corresponding to application (end use) temperatures. In Zone III the complex viscosity is high and varies slightly with further decrease in temperature. Such a complex viscosity profile provides, in hot melt adhesive applications, a desirable combination of long opening time at processing temperatures and fast set time at lower temperatures.

In a preferred embodiment, the POA's have less than 1 mol % ethylene, have at least 2 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 5 mol % as measured by Carbon 13 NMR as described below.

In an another embodiment, the POA's have between 1 and 10 mol % ethylene, have at least 2+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

In a preferred embodiment, the POA's have less than 1 mol % ethylene, have an amorphous component (which is defined to be that portion of the polymer composition that has a crystallinity of less than 5%) which contains at least 3 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 20 mol % as measured by Carbon 13 NMR as described below.

In an another embodiment, the POA's have between 1 and 10 mol % ethylene and have an amorphous component (which is defined to be that portion of the polymer composition that has a crystallinity of less than 20%) which contains at least 3+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

In a preferred embodiment the POA's comprise an olefin homopolymer or copolymer, having less than 5 mol % ethylene, and comprising one or more C3 to C40 alpha olefins. In another preferred embodiment the POA, having less than 5 mol % ethylene, further comprises one or more diolefin comonomers, preferably one or more C4 to C40 diolefins.

In a preferred embodiment the POA is a propylene homopolymer or copolymer. The comonomer is preferably a C4 to C20 linear, branched or cyclic monomer, and in one embodiment is a C4 to C12 linear or branched alpha-olefin, preferably butene, pentene, hexene, heptene, octene, nonene, decene, dodecene, 4-methyl-pentene-1,3-methyl pentene-1, 3,5,5-trimethyl-hexene-1, and the like. Ethylene may be present at 5 mol % or less.

In another embodiment the POA is a copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In a preferred embodiment, the POA may be a polymer of two or more linear, branched, cyclic-containing, or a mixture of these structures. Preferred linear alpha-olefins include C3 to C8 alpha-olefins, more preferably propylene, 1-butene, 1-hexene, and 1-octene, even more preferably propylene or 1-butene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the POA at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the polymer is homo-polypropylene. In another preferred embodiment the POA comprises propylene, less than 5 mol % ethylene, and at least one divinyl comonomer. In another preferred embodiment the POA comprises propylene and at least one divinyl comonomer.

The POA's described herein may be produced by a process comprising:
1) selecting a first catalyst component capable of producing a polymer having a Mw of 100,000 or less and a heat of fusion of 10 J/g or less under the selected reaction conditions;
2) selecting a second catalyst component capable of producing polymer having an Mw of 100,000 or less and a crystallinity of 20% or more under the selected reaction conditions; and
3) contacting the catalyst components in the presence of one or more activators with one or more olefins, in a reaction zone.

The POA's described herein may be produced by a process comprising:
1) selecting a first catalyst component capable of producing a polymer having an Mw of 100,000 or less and a heat of fusion of 10 J/g or less;
2) selecting a second catalyst component capable of producing polymer having an Mw of 100,000 or less and a crystallinity of 20% or more;
3) contacting the catalyst components in the presence of one or more activators with one or more olefins and one or more dienes, in a reaction zone.

The POA's described herein may be produced by a process comprising:
1) selecting a first catalyst component capable of producing a polymer having an Mw of 100,000 or less and a heat of fusion of 10 J/g or less, capable of polymerizing macromonomers having reactive termini;
2) selecting a second catalyst component capable of producing macromonomers having reactive termini, an Mw of 100,000 or less and a crystallinity of 20% or more; and
3) contacting the catalyst components in the presence of one or more activators with one or more olefins, and optionally a diolefin in a reaction zone.

The POA's described herein may be produced by a process comprising:
1) selecting a first catalyst component capable of producing a polymer having an Mw of 50,000 or less and a heat of fusion of 10 J/g or less, capable of polymerizing macromonomers having reactive termini;
2) selecting a second catalyst component capable of producing macromonomers having reactive termini, an Mw of 30,000 or less and a crystallinity of 20% or more;
3) contacting the catalyst components in the presence of one or more activators with propylene, and optionally other olefins, in a reaction zone.

The POA's may be produced by a continuous process comprising:

1) selecting a first catalyst component capable of producing a polymer having an Mw of 100,000 or less, preferably 80,000 or less, preferably 60,000 or less and a crystallinity of 5% or less, preferably 3% or less, more preferably 2% or less, under selected polymerization conditions;
2) selecting a second catalyst component capable of producing polymer having an Mw of 100,000 or less, preferably 80,000 or less, preferably 60,000 or less and a crystallinity of 30% or more, preferably 50% or more, more preferably 60% or more at the selected polymerization conditions;
3) contacting, under the selected polymerization conditions, the catalyst components in the presence of one or more activators with one or more C3 to C40 olefins, preferably one or more C3 to C12 olefins, preferably C3 and one or more C4 to C20 comonomers, and, optionally one or more diolefins, preferably a C4 to C20 diene;
4) at a temperature of greater than 100° C., preferably greater than 105° C., more preferably greater than 110° C., more preferably greater than 115° C.;
5) at a residence time of 120 minutes or less, preferably 50 minutes or less, preferably 40 minutes, preferably 30 minutes or less, preferably 25 minutes or less, more preferably 20 minutes or less, more preferably 15 minutes or less, more preferably at 10 minutes or less, more preferably at 5 minutes or less, or alternately between 120 minutes and 60 minutes;
6) wherein the ratio of the first catalyst to the second catalyst is from 1:1 to 50:1, preferably 1:1 to 40:1, more preferably 1:1 to 1:30;
7) wherein the activity of the catalyst components is at least 3 kilograms, preferably at least 50 kilograms, more preferably at least 100 kilograms, more preferably at least 200 kilograms, more preferably, 300 kilograms, more preferably 400 kilograms, more preferably 500 kilograms of polymer per gram of the catalyst mixture; and wherein at least 80%, preferably at least 85%, more preferably at least 90%, more preferably at least 95% of the olefins are converted to polymer.

In another embodiment at least 20% or more of the olefins are converted to polymer, preferably 20% or more, more preferably 60% or more, more preferably 75% or more, more preferably 85% or more, more preferably 95% or more.

In a preferred embodiment the process described above takes place in a solution phase, slurry or bulk phase polymerization process.

By continuous is meant a system that operates (or is intended to operate) without interruption or cessation. For example, a continuous process to produce a polymer would be one where the reactants are continually introduced into one or more reactors and polymer product is continually withdrawn.

In another preferred embodiment, in the process described above the concentrations of the reactants vary by 20% or less in the reaction zone during the residence time, preferably by 15% or less, more preferably by 10% or less. In a preferred embodiment the concentration of the monomer(s) remains constant in the reaction zone during the residence time. Preferably the concentration of the monomer(s) varies by 20% or less, preferably by 15% or less, more preferably by 10% or less, more preferably by 5% or less.

In a preferred embodiment the concentration of the catalyst components remains constant in the reaction zone during the residence time. Preferably the concentration of the monomer(s) varies by 20% or less, preferably by 15% or less, more preferably by 10% or less, more preferably by 5% or less.

In a preferred embodiment the concentration of the activator(s) remains constant in the reaction zone during the residence time. Preferably the concentration of the monomer(s) varies by 20% or less, preferably by 15% or less, more preferably by 10% or less, more preferably by 5% or less.

In another preferred embodiment a third catalyst (or more) may be present in the processes described above. The third catalyst may be any of the catalyst components listed herein. Preferred third catalysts include catalysts that are capable of producing waxes. Other preferred third catalysts may include any catalyst described herein. One may select two or more catalysts to produce various macromonomers having reactive termini, used in combination with a catalyst that can polymerize such macromonomers. One may select two or more catalysts that can polymerize macromonomers and one catalyst that can produce macromonomers with reactive termini. Likewise one could also select three catalysts that produce different polymers under the same reaction conditions. For example one could select a catalyst that produces a somewhat crystalline polymer, one that produces a very crystalline polymer and one that produces an amorphous polymer, any of which may produce macromonomers with reactive termini or polymerize polymers having reactive termini. Similarly one could select two catalysts, one that produces crystalline polymers and one that produces an amorphous polymer, any of which may make macromonomers with reactive termini or polymerize polymers having reactive termini. Likewise one could select a catalyst that produces a somewhat crystalline polymer, one that produces a wax and one that produces an amorphous polymer, any of which may make macromonomers with reactive termini or polymerize polymers having reactive termini.

By reaction zone is meant an area where the activated catalyst and monomers can react.

By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer (which tend to be molecules larger than a typical single monomer such as ethylene or propylene), having reactive termini into a growing polymer chain. Vinyl terminated chains are generally more reactive than vinylene or vinylidene terminated chains.

In a particular embodiment the POA is produced by copolymerizing one or more $C_3$ or higher alpha-olefins and/or one or more di-vinyl monomers, and optionally up to 5 mol % ethylene, in the presence of at least one stereospecific catalyst system and at least one other catalyst system in the same polymerization medium. Preferably, the polymerizations are carried out simultaneously in the presence of both catalysts. The polymer so produced may contain amorphous polymer segments and crystalline polymer segments in which at least some of the segments are linked. Typically the amorphous and the crystalline polymer segments are copolymers of one or more alpha-olefins (optionally including up to 5 mol % ethylene) and/or one or more monomers having at least two olefinically unsaturated bonds. Both of these unsaturated bonds are suitable for and readily incorporated into a growing polymer chain by coordination polymerization using either the first or second catalyst systems independently such that the di-olefin is incorporated into polymer segments produced by both catalysts in the mixed catalyst system according to this invention. In a preferred embodiment these monomers having at least two olefinically unsaturated bonds are di-olefins, preferably di-vinyl monomers. Crosslinking of at least a portion of the mixture of polymer segments is believed to be accomplished during the polymerization of the composition by incorporation of a portion of di-vinyl comonomers into two polymer segments, thus producing a crosslink between those segments.

In another embodiment, POAs containing amorphous and semi-crystalline components may be prepared in a single reactor to yield desired property balance. In particular, aPP-g-scPP branch structures may be produced in-situ in a continuous solution reactor using mixed catalysts and propylene as the preferred feed. In one embodiment stereospecific bridged bis-indenyl group 4 catalysts can be selected to produce semicrystalline PP macromonomers. (All references to the Periodic Table of the Elements are to the new notation of the Table published in Chemical and Engineering News, 63(5), 27, 1985.) A bridged mono-cyclopentadienyl heteroatom group 4 catalyst can be used to build amorphous PP (aPP) backbone while simultaneously incorporating some of the semi-crystalline macromonomers (scPP). This is believed to produce an aPP-g-scPP structure where the "-g-" indicates that the polymer types are at least partially grafted. By selecting the catalysts, the polymerization reaction conditions, and/or by introducing a diene modifier, the amorphous and crystalline components can be linked together to produce various branch-block structures. To effectively incorporate into a growing chain, a macromonomer with vinyl end group is preferred. Other types of chain end unsaturations (vinylene and vinylidene) can also be used. While not wishing to be bound by theory, branch-block copolymer is believed to comprise an amorphous backbone having crystalline side chains originating from the scPP macromonomers and the sidechains are believed to be polypropylene macromonomers, which can be prepared under solution polymerization conditions with catalysts suitable for preparing either of isotactic or syndiotactic polypropylene.

Any catalyst compound that can produce the desired polymer species (i.e. a polymer having an Mw of 100,000 or less and a heat of fusion of 70 J/g or less, or a polymer having an Mw of 100,000 or less and a crystallinity of 40% or less) may be used in the practice of this invention.

Functionalized Component

Typically, the component to be functionalized is combined with a free radical initiator and a grafting monomer or other functional group (such as maleic acid or maleic anhydride) and is heated to react the monomer with the polymer, copolymer, oligomer, etc to form the functionalized component. Multiple methods exist in the art for functionalizing polymers that may be used with the polymers described here. These include, not are not limited to, selective oxidation, free radical grafting, ozonolysis, epoxidation, and the like.

Preferred functional components have an Mw of 1000 to 20,000, preferably 2000 to 15,000, more preferably 3000 to 10,000.

Examples of suitable functionalized components for use in this invention include, but are not limited to, functionalized olefin polymers, (such as functionalized C2-C40 homopolymers, functionalized C2-C40 copolymers, functionalized higher Mw waxes), functionalized oligomers, (such as functionalized low Mw waxes, functionalized tackifiers), beta nucleating agents and combinations thereof.

Useful functionalized olefin polymers and copolymers useful in this invention include maleated polyethylene, maleated metallocene polyethylene (such as EXACT and EXCEED-available from ExxonMobil Chemical Company in Houston, Tex.—which have been functionalized as described herein), maleated metallocene polypropylene (such as ACHIEVE—available from ExxonMobil Chemical Company in Houston, Tex.—which has been functionalized as described herein), maleated ethylene propylene rubber, maleated polypropylene, maleated ethylene copolymers (such as EXXELOR™ by ExxonMobil Chemical Company in Houston, Tex., particularly EXXELOR VA 1801, 1803, 1840 and EXXELOR PO 1015 and 1020), functionalized polyisobutylene (typically functionalized with maleic anhydride typically to form a succinic anhydride), and the like.

Preferred functionalized waxes useful as functionalized components herein include those modified with an alcohol, an acid, a ketone, an anhydride and the like. Preferred examples include waxes modified by methyl ketone, maleic anhydride or maleic acid. Preferred functionalized waxes useful herein include maleated polypropylene was available from Chusei under the tradename MAPP 40, maleated metallocene waxes (such as TP LICOCENE PP1602 available from Clariant, in Augsburg, Germany); maleated polyethylene waxes and maleted polypropylene waxes available from Eastman Chemical in Kingsport Tenn. under the trade names EPOLENE C-16, EPOLENE C-18, EPOLENE E43, EPOLENE G-3003; maleated polypropylene wax LICOMONT AR 504 available from Clariant; grafted functional polymers available from Dow Chemical Co., under the tradenames AMPLIFY EA 100, AMPLIFY EA 102, AMPLIFY 103, AMPLIFY GR 202, AMPLIFY GR 205, AMPLIFYGR 207, AMPLIFY GR 208, AMPLIFY GR 209, AMPLIFY VA 200; CERAMER maleated ethylene polymers available from Baker Hughes under the tradename CERAMER 1608, CERAMER 1251, CERAMER 67, CERAMER 24; and ethylene methyl acrylate co and terpolymers.

Useful waxes include polypropylene waxes having an Mw weight of 15,000 for less, preferably from 3000 to 10,000 and a crystallinity of 5% or more, preferably 10% or more having a functional group content (preferably maleic anhydride) of up to 10 weight %.

Additional preferred functionalized polymers for use as functional components herein include A-C X596A, A-C X596P, A-C X597A, A-C X597P, A-C X950P, A-C X1221, A-C 395A, A-C 395A, A-C 1302P, A-C 540, A-C 54A, A-C 629, A-C 629A, and A-C 307, A-C 307A available from Honeywell.

Preferred functionalized polymers have crystallinity of at least 5%, preferably at least 10%.

UNILIN long chain alcohols, available from Baker Hughes are also useful as functionalized components herein, particularly UNILIN 350, UNILIN 425, UNILIN 550, and UNILIN 700.

UNICID linear, primary carboxylic acids, available from Baker Hughes are also useful as functionalized components herein, particularly UNICID 350, UNICID 425, UNICID 550, and UNICID 700.

Preferred functionalized hydrocarbon resins that may be used as functionallized components in this invention include those described in WO 03/025084, WO 03/025037, WO 03/025036, and EP 1 295 926 A1 which are incorporated by reference herein.

In a preferred embodiment a hydrocarbon resin is functionalized with an unsaturated acids or anhydrides containing at least one double bond and at least one carbonyl group and used as the functionalized component of this invention. Preferred hydrocarbon resins that can be functionalized are listed below as tackifiers. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, alpha.methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride. In a preferred embodiment the unsaturated acid or anhydried comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof.

In some embodiments, however the functionalized component does not comprise functionalized hydrocarbon resins. In some embodiments, functionalized hydrocarbon resin is present at 5 weight % or less, preferably 4 weight % or less, preferably 3 weight % or less, preferably at 2 weight % or less, preferably at 1 weight % or less, preferably at 0.5 weight % or less, preferably at 0.1 weight % or less, preferably at 0.01 weight % or less, preferably at 0.001 weight % or less, based upon the weight of the adhesive. In some preferred embodiments, functionalized hydrocarbon resin is not present in the adhesive.

Preferred beta nucleating agents useful in this invention include: amide compound selected from the group consisting of:

(1) an amide compound of the formula

$$R^2\text{—NHCO—}R^1\text{—CONH—}R^3 \quad (1)$$

wherein $R^1$ is a residue formed by elimination of the two carboxyl groups of a C3-26 saturated or unsaturated aliphatic dicarboxylic acid, a C6-30 saturated or unsaturated alicyclic dicarboxylic acid or a C8-30 aromatic dicarboxylic acid; $R^2$ and $R^3$ are the same or different and each represents a C3-18 cycloalkyl group, a C3-12 cycloalkenyl group, or a substituted or unsubstituted phenyl or cyclohexyl group;

(2) an amide compound of the formula

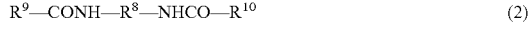

$$R^9\text{—CONH—}R^8\text{—NHCO—}R^{10} \quad (2)$$

wherein $R^8$ is a residue formed by elimination of the two amino groups of a C1-24 saturated or unsaturated aliphatic diamine, a C4-28 alicyclic diamine, a C4-14 heterocyclic diamine or a C6-28 aromatic diamine; $R^9$ and $R^{10}$ are the same or different and each represents a C3-12 cycloalkyl group, a C3-12 cycloalkenyl group, or a substituted or unsubstituted phenyl or cyclohexyl group; and (3) an amide compound of the formula

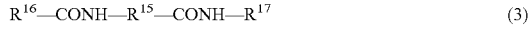

$$R^{16}\text{—CONH—}R^{15}\text{—CONH—}R^{17} \quad (3)$$

wherein $R^{15}$ is a residue formed by elimination of one amino group and one carboxyl group from of a C2-29 saturated or unsaturated aliphatic amino acid, C7-13 saturated or unsaturated alicyclic amino acid or C7-15 aromatic amino acid; $R^{16}$ and $R^{17}$ are the same or different and $R^{16}$ has the same meaning as $R^9$ or $R^{10}$ in the formula (2) and $R^{17}$ has the same meaning as $R^2$ or $R^3$ in the formula (1).

Preferred beta nucleating agents useful in this invention include: N,N'-diphenylhexanediamide, N,N'-dicyclohexyl-terephthalamide, N,N'-dicyclohexyl-2,6-naphthalenedicarboxamide, N,N'-dicyclohexanecabonyl-p-phenylenediamine, N,N'-dibenzoyl-1,5-diaminonaphthalene, N,N'-dibenzoyl-1,4-diaminocyclohexane or N,N'-dicyclohexanecarbonyl-1,4-diaminocyclohexane, N-cyclohexyl-4-(N-cyclohexylcarbonylamino)benzamide, N-phenyl-5-(N-benzoylamino)pentanamide, sorbitol, salicyclic acid, p-hydroxybenzoic acid, zinc 3,5-di-tert-butylsalicyclate, 2-naphthoic acid, phenyl acetic acid, terephthalic acid, anthranilic acid, 3,3-diphenylpropionic, tetra butyl ammonium chloride, naphthalic acid, benzoin, ascorbic acid, adipic acid, tertabutyl benzoate, dodecylbenzenesulfonic acid sodium salt, 4-dodecylbenzenesulfonic acid, 4,4-bis(4-hydroxyphenyl)valeric acid, diphenic acid, 4-isopropylbenzoic acid, Millad 3988tm, neodecanoic acid, abietic acid, sodium benzoate, succinic anhydride, phenol, benzoic acid, benzyl alcohol, benzyl amine, alkyl substituted succinates (preferably C1 to C40 alkyl substituted succinates), substituted di(benzylidene)-D-sorbitols, 1,3:2,4-di(benzylidene)-D-sorbitol, 1,3:2,4-bis(3,4-dimethylbenzylidene)-D-sorbitol, red quinacridone dye, Preferred beta nucleating agents useful in this invention include the agents listed in U.S. Pat. No. 5,231,126; the single walled carbon nanotubes described in J. Phys. Chem. B. 2002, 106, 5852-5858; Modern Plastics, September 1998, page 82.

Preferred beta nucleating agents useful in this invention include beta-spherulite nucleating agents. U.S. Pat. No. 4,975,469 and the references cited therein, incorporated herein by reference, disclose beta-spherulite nucleating agents such as the gamma-crystalline form of a quinacridone colorant, the bisodium salt of orthophthalic acid, the aluminum salt of 6-quinizarin sulfonic acid and to a lesser degree isophthalic and terephthalic acids. The nucleating agents are typically used in the form of powdered solids. To produce beta-spherulites efficiently the powder particles of the nucleating agent should be less than 5 microns in diameter and preferably no greater than 1 micron in diameter. The preferred beta-spherulite nucleating agent that may be used in the polymeric compositions of this invention is the gamma-crystalline form of a quinacridone colorant. One form of the quinacridone colorant is red quinacridone dye, hereinafter also referred to as "Q-dye", having the structure shown in U.S. Pat. No. 4,975,469.

In a preferred embodiment the beta nucleating agent is present in the adhesive at up to 5 weight %, preferably 0.0001 to 3 weight %, preferably 0.1 to 2 weight %, preferably at 0.01 to 10 ppm, based upon the weight of the blend.

For more information on beta nucleation and beta nucleating agents, please see pages 137-138 (and the references cited therein) of *Propylene Handbook*, Edward P. Moore, ed. Hanser publishers, New York, 1996.

The polymers, copolymers, oligomers, etc and blends thereof, may be functionalized for use in the present invention such that functional groups may be grafted onto the polymers, preferably utilizing radical copolymerization of an functional group, also referred to herein as graft copolymerization. The end result being a functionalized polymer, copolymer oligomer, hydrocarbon resin, etc, abbreviated herein as AA-g-XX, wherein AA represents the specific type of polymer, copolymer, oligomer or hydrocarbon resin being functionalized, XX refers to the functional group or compounds with which the polymer was functionalized with, and -g- represents grafting between the two moieties.

Preferred functional groups include any compound with a weight average molecular weight of 1000 or less, preferably 750 or less, that contain one or more a heteroatoms and or one or more unsaturations. Preferably the functional group is a compound containing a heteroatom, such as maleic anhydride. Preferred functional groups include organic acids, organic amides, organic amines, organic esters, organic anhydrides, organic alcohols, organic acid halides (such as acid chlorides, acid bromides, etc.) organic peroxides, and salts thereof.

Examples of preferred functional groups useful in this invention include compounds comprising a carbonyl bond such as carboxylic acids, esters of the unsaturated carboxylic acids, acid anhydrides, di-esters, salts, amides, imides, aromatic vinyl compounds hydrolyzable unsaturated silane compounds and unsaturated halogenated hydrocarbons.

Examples of particularly preferred functional groups useful in this invention include, but are not limited to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo (2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4.4)non-7-ene, bicyclo (2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Examples of esters of unsaturated carboxylic acids useful in this invention as functional groups include methyl acrylate, ethyl acrylate, butyl acrylate, methyl methacrylate, ethyl methacrylate and butyl methacrylate.

Examples of hydrolyzable unsaturated silane compounds useful as functional groups in this invention include radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid or the like. Examples thereof include vinyltrichlorosilane, vinyltris(beta-methoxyethoxy)silane, vinyltriethoxysilane, vinyltrimethoxysilane, gamma-methacryloxypropyltrimethoxysilane monovinylsilane and monoallylsilane.

Examples of unsaturated halogenated hydrocarbons useful as functional groups in this invention include vinyl chloride and vinylidene chloride.

In a preferred embodiment, the functionalized components include propylene, and may be grafted with maleic anhydride (MA), to produce polypropylene copolymer grafted maleic anhydride, wherein the maleic anhydride is covalently bonded to the polymer chain of the polymeric composition. The anhydride functionality grafted onto the polypropylene copolymer may remain as an anhydride, may be oxidized into acid functional groups, and/or may be further reacted by processes known in the art to induce other functional groups such as amides, amines, and the like.

Preferable examples of the radical initiator used in the graft copolymerization include organic peroxides such as benzoyl peroxide, methyl ethyl ketone peroxide, cyclohexanone peroxide, t-butylperoxyisopropyl carbonate, di-ti-butyl perphthalate, 2,5-dimethyl-2,5-di(t-butylperoxy)hexene, 2,5-dimethyl-2,5-di(t-butylperoxy)hexene-3, di-t-butyl peroxide, cumene hydroperoxide, t-butyl hydroperoxide, dilauryl peroxide and dicumyl peroxide.

The functionalized polymer of the present invention may thus be obtained by heating the polymer and the radical polymerizable functional group in the presence of the radical initiator at, near, or above a decomposition temperature of the radical initiator.

In some embodiments, no particular restriction need be put on the amount of the functional group to be used, accordingly, conventional conditions for functionalizing, for example, an isotactic polypropylene, can be utilized as is in the practice of this invention. Since in some cases the efficiency of the copolymerization is relatively high, the amount of the functional group may be small. In an embodiment, the amount of the functional group to be incorporated into the polymer, copolymer or oligomer is preferably from about 0.001 to 50 wt % functional group with respect to the total weight of the polymer. In an preferred embodiment, the amount of the maleic anhydride to be incorporated into the polymer, copolymer or oligomer is preferably from about 0.001 to 50 wt % MA with respect to the total weight of the polymer.

The radical initiator is preferably used in a ratio of from 0.00001 to 10 wt %, based on the weight of the functional group. The heating temperature depends upon whether or not the reaction is carried out in the presence of a solvent, but it is usually from about 50° C. to 350° C. When the heating temperature is less than 50° C., the reaction may be slow and thus efficiency may be low. When it is more than 350° C., decomposition of the PP copolymer may occur. The functionalized component may be functionalized with an functional group utilizing a solvent based functionalization process and/or utilizing a melt based functionalization process without a solvent.

In the solvent based process, the reaction may be carried out using the polymer in the form of a solution or a slurry having a concentration of from 0.1 to 50 wt % in the presence of a halogenated hydrocarbon compound having 2 to 20 carbon atoms, an aromatic compound, a halogenated aromatic compound, an alkyl substituted aromatic hydrocarbon, a cyclic hydrocarbon, and/or a hydrocarbon compound having 6 to 20 carbon atoms which is stable to the radicals.

In the functionalization process utilizing a melt based functionalization process without a solvent, the reaction may be carried out in the absence of the solvent in a device such as an extruder which can sufficiently produce physical contact between what may be a highly viscous polymer. In the latter case, the reaction is usually effected at a relatively high temperature, as compared with the reaction in the state of the solution.

Other methods for functionalizing polymers that may be used with the polymers described herein include, but are not limited to, selective oxidation, ozonolysis, epoxidation, and the like, both in solution or slurry (i.e., with a solvent), or in a melt (i.e., without a solvent).

The functionalized components may be a single polymer which has been functionalized as described herein. In another embodiment, the functionalized component of the present invention may be a blend of polymers which are functionalized together during a single process. The functionalized components of the present invention may also include a plurality of functionalized components which are combined after being individually functionalized, or any combination thereof.

In the present invention, the graft polymerization (grafting of the polymer) can be carried out in an aqueous medium. In this case a dispersant can be used, and examples of the dispersant include a saponified polyvinyl acetate, modified celluloses such as hydroxyethyl cellulose and hydroxypropyl cellulose, and compounds containing an OH group such as polyacrylic acid and polymethacrylic acid. In addition, compounds which are used in a usual aqueous suspension polymerization can also be widely employed.

The reaction may be carried out by suspending the polymer, the water-insoluble radical polymerizable monomer, the water-insoluble radical initiator and/or the dispersant in water, and then heating the mixture. Here, a ratio of water to the sum of the radical polymerizable monomer (i.e., the functional group) and the PP copolymer is preferably 1:0.1 to 1:200, more preferably 1:1 to 1:100. The heating temperature is such that the half-life of the radical initiator is preferably from 0.1 to 100 hours, more preferably from 0.2 to 10 hours, and it is preferably from 30° to 200° C., more preferably from 40° to 150° C. In the heating step, it is preferred that the mixture is stirred sufficiently so as to become in a suspension state. In this way, the graft polymer (i.e., the functionalized component) may be obtained in granular form.

A weight ratio of the water-insoluble monomer to the polymer may preferably be from 1:01 to 1:10000, and a weight ratio of the radical initiator to the water-insoluble monomer may be from 0.00001 to 0.1. The ratio of the water-insoluble monomer in the functionalized component depends upon its use, but the amount of the monomer may be from 0.1 to 200% by weight based on the weight of the graft copolymer.

The obtained functionalized component preferably contains a desired amount of radical polymerizable functional group units in the range of from 0.1 to 50 wt % based on the weight of the polymer in compliance with its use or application. When the content of the radical polymerizable functional group units is in excess of 50 wt %, the particular polymer may not exert intrinsic physical properties, and when it is less than the above-mentioned lower limit, the physical properties as the graft copolymer may not be obtained.

Furthermore, a compatibilizing effect within the inventive composition obtained by inclusion of the functionalized component may be influenced by the level of grafting. In an embodiment, the polymer, copolymer, oligomer, etc. may be functionalized (e.g., grafted) to include about 0.001 wt % or greater of the functional group attached and/or incorporated into the polymer backbone. The polymer may also be functionalized grafted to a higher degree. The level of functionalization (e.g., the grafting level) may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt %, preferably less than about 1.5 wt %, preferably less than about 1 wt %, preferably less than about 0.5 wt %.

In a preferred embodiment, the blend comprises POA and a functionalized syndiotactic rich C3-C40 homopolymer, still more preferably the composition comprises a copolymer or homopolymer comprising functionalized syndiotactic rich polypropylene (srPP).

For simplicity, syndiotactic rich polymers may also be referred to herein simply as syndiotactic polymers. Syndiotactic polymers suitable for use herein comprise a unique stereochemical structure in which monomeric units having enantiomorphic configuration of the asymmetrical carbon atoms follow each other alternately and regularly in the macromolecular main chain. Examples of syndiotactic polypropylene include those described in U.S. Pat. No. 3,258,455, which were obtained by using a catalyst prepared from titanium trichloride and diethyl aluminum monochloride. U.S. Pat. No. 3,305,538, is directed to vanadium triacetylacetonate or halogenated vanadium compounds in combination with organic aluminum compounds for producing syndiotactic polypropylene. U.S. Pat. No. 3,364,190 is directed to a catalyst system composed of finely divided titanium or vanadium trichloride, aluminum chloride, a trialkyl aluminum and a phosphorus-containing Lewis base for producing syndiotactic polypropylene.

The structure and properties of syndiotactic polypropylene differ significantly from those of isotactic polypropylene. The isotactic structure is typically described as having long sequences of monomer units with the same relative configuration of the tertiary carbon atoms. Using the Fischer projection formula, the stereochemical sequence of isotactic polypropylene is described as follows:

The methyl groups attached to the tertiary carbon atoms of successive monomeric units on the same side of a hypothetical plane through the main chain of the polymer, e.g., the methyl groups are all above or below the plane. Another way of describing the structure is through the use of NMR, wherein an isotactic pentad is . . . mmmmm . . . with each "m" representing a "meso" dyad or successive methyl groups on the same side in the plane. Any deviation or inversion in the structure of the chain lowers the degree of isotacticity and thus the crystallinity of the polymer.

In contrast to the isotactic structure, syndiotactic polymers are those in which long sequences of monomer units have an alternating relative configuration of the tertiary carbon atoms. Using the Fischer projection formula, the structure of a syndiotactic polymer is designated as:

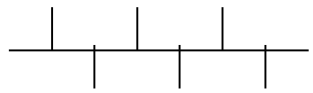

The methyl groups attached to the tertiary carbon atoms of successive monomeric units in the chain lie on alternate sides of the plane of the polymer. In NMR nomenclature, this pentad is described as . . . rrrrr . . . in which each "r" represents a "racemic" dyad, i.e., successive methyl groups on alternate side of the plane. The percentage of r dyads in the chain determines the degree of syndiotacticity of the polymer. Syndiotactic polymers may be crystalline and may be similar to isotactic polymers in that they may be insoluble in xylene. This crystallinity distinguishes both syndiotactic and isotactic polymers from atactic polymer, which may be soluble in xylene. Atactic polymer exhibits no regular order of repeating unit configurations in the polymer chain and may thus form a waxy product.

Preparation and Composition of Syndiotactic Polymers

Catalyst capable of producing syndiotactic rich polypropylene include those disclosed in U.S. Pat. Nos. 5,476,914, 6,184,326, 6,245,870, 5,373,059, 5,374,685, and 5,326,824.

In addition to propylene, the syndiotactic enriched polymer may include other alpha olefins within the base polymer, including ethylene ($C_2$) and from $C_4$ to $C_{40}$. Examples of alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1,4-methylepentene-1, and 4,4-dimethylepentene-1. The amount of the other alpha olefins, when present, may be greater than about 0.001% by weight (wt %), based on the total weight of the polymer. Preferably, the amount of the other alpha olefins is greater than or equal to about 0.1 wt %, more preferably greater than or equal to about 1 wt %. The other alpha olefins may also be present in the base polymer about 50 wt % or less. Preferably, the amount of the other alpha olefins is less than or equal to about 20 wt %, more preferably less than or equal to about 10 wt %.

Syndiotactic rich polypropylene, (srPP) polymers, as defined herein, comprise at least about 50% [r] dyads. Preferably at least about 55% [r] dyads, with at least about 60% [r] dyads preferred, with at least about 65% [r] dyads more preferred, with at least about 70% [r] dyads more preferred, with at least about 75% [r] dyads more preferred, with at least about 80% [r] dyads yet more preferred, with at least about 85% [r] dyads still more preferred, with at least about 90% [r] dyads still more preferred, with at least about 95% [r] dyads yet still more preferred.

Syndiotactic rich polypropylene may also comprise less than about 55% [r] dyads. Preferably less than about 60% [r] dyads, with less than about 65% [r] dyads preferred, with less than about 70% [r] dyads more preferred, with less than about 75% [r] dyads more preferred, with less than about 80% [r] dyads more preferred, with less than about 85% [r] dyads yet more preferred, with less than about 90% [r] dyads still more preferred, with less than about 92% [r] dyads still more preferred, with less than about 99% [r] dyads yet still more preferred.

In a preferred embodiment, syndiotactic rich polypropylenes may be defined as polypropylene containing about 58 to 75% [r] dyads, and have no or very low (e.g., less than about 10%) crystallinity.

In a preferred embodiment the blend comprises POA and functionalized srPP. Preferably the srPP is present at 1 to 99 weight %, preferably 2 to 85 weight %, preferably 3 to 50 weight %, more preferably 4 to 40 weight %, based upon the weight of the blend.

In another embodiment, a master batch of the functionalized polymer is prepared. A preferred mixing ratio between the functionalized component and a polymer (such as a POA or other homopolymer or copolymer of an alpha-olefin) is such that the radical polymerizable functional group units, preferably the unsaturated carboxylic acid units in the masterbatch are present in an amount of 0.001 to 50% by weight, based on the total weight of the polymer and the functionalized component. In a preferred embodiment, the functional groups in the functionalized component (preferably functionalized propylene homopolymer or copolymer, preferably srPP), may be about 0.01 wt % or greater, preferably about 0.1 wt % or greater, preferably about 0.5 wt % or greater, preferably about 1 wt % or greater, preferably about 5 wt % or greater, preferably about 10 wt % or greater, preferably about 15 wt % or greater, preferably about 20 wt % or greater, about 30 wt % or greater, preferably about 40 wt % or greater, based on the total weight of the functionalized propylene homopolymer or copolymer. Preferably, the functional group in the functionalized propylene homopolymer or copolymer, preferably srPP, is about 45 wt % or less, preferably about 35 wt % or less, preferably about 25 wt % or less, preferably about 20 wt % or less, preferably about 15 wt % or less, preferably about 10 wt % or less, preferably about 5 wt % or less, preferably about 1 wt % or less, based on the total weight of the functionalized propylene homopolymer or copolymer.

In the process utilized for producing the functionalized propylene homopolymer or copolymer, no particular restriction need be put on a mixing manner, accordingly, the raw materials may be mixed uniformly by means of a Henschel mixer or the like and then may be melted, mixed and molded into pellets by an extruder or the like. It is also possible to utilize a Brabender by which mixing and melting are carried out simultaneously, and after the melting, the material can be directly molded into films, sheets, or the like.

Functionalized Propylene Copolymers

In another embodiment the functionalized component comprises one or more functionalized polypropylene copolymers derived from propylene copolymers having elastic properties. Such preferred functionalized propylene copolymers may be prepared according the procedures in WO 02/36651 which is incorporated by reference here. Likewise the polymers described in WO 03/040202, WO 03/040095, WO 03/040201, WO 03/040233, WO 03/040442 may be functionalized as described herein and used in the practice of this invention. Additionally the polymers described in EP 1,233,191, U.S. Pat. No. 6,525,157 may be functionalized as described herein and used in the practice of this invention.

Preferred propylene copolymers to be functionalized and used herein include those prepared by polymerizing propylene with a $C_2$ or $C_4$-$C_{20}$ alpha olefin, most preferably propylene and ethylene in the presence of a chiral metallocene catalyst with an activator and optionally a scavenger. The co-monomer used with propylene may be linear or branched. Preferred linear alpha-olefins include ethylene ($C_2$) and $C_4$ to $C_8$ alpha olefins. Examples of preferred a-olefins include ethylene, 1-butene, 1-hexene, and 1-octene, even more preferably ethylene or 1-butene. Preferred branched α-olefins include 4-methyl-1-pentene, 3-methyl-1-pentene, and 3,5,5-trimethyl-1-hexene.

Preferred propylene copolymers to be functionalized and used herein include propylene copolymers may have an average propylene content on a molar basis of from about 68% to about 92%, more preferably from about 75% to about 91%, even more preferably from about 78% to about 88%, most preferably from about 80% to about 88%. The balance of the copolymer may be one or more α-olefins as specified above and optionally minor amounts of one or more diene monomers. Preferably, the polypropylene copolymer comprises ethylene as the comonomer in the range of from about 8 to 32 mole % ethylene, more preferably from about 9 to about 25 mole % ethylene, even more preferably from about 12 to about 22 mole % ethylene and most preferably from about 13 to 20 mole % ethylene.

The use of a chiral metallocene catalyst ensures that the methyl group of the propylene residues have predominantly the same tacticity. Both syndiotactic and isotactic configuration of the propylene are possible though the isotactic polymers are preferred. The tacticity of the propylene residues leads to crystallinity in the polymers. For the polymers of the present invention the low levels of crystallinity in the polypropylene copolymer are derived from isotactic polypropylene obtained by incorporating alpha-olefin co-monomers as described above. Preferred propylene copolymers to be functionalized and used herein include semi-crystalline propylene copolymers preferably having:

1. a heat of fusion from about 0.5 J/g to about 25 J/g, more preferably from about 1 J/g to about 20 J/g, and most preferably from about 1 J/g to about 15 J/g; and/or
2. a crystallinity of about 0.25% to about 15%, more preferably from about 0.5% to about 13%, and most preferably from about 0.5% to about 11% (The crystallinity of the polypropylene copolymer is expressed in terms of percentage of crystallinity. The thermal energy for the highest order of polypropylene is estimated at 189 J/g. That is, 100% crystallinity is equal to 189 J/g.); and/or
3. a single broad melting point or melting transition (A sample of the polypropylene copolymer may show a secondary melting peak or peaks adjacent to a principal peak, yet for the purposes herein, these are considered together as a single melting point or melting transition.); and or 4. a melting point of from about 25° C. to about 75° C., preferably in the range of from about 25° C. to about 65° C., more preferably in the range of from about 30° C. to about 60° C. (The highest of melting transition peaks is considered the melting point.); and/or
5. a weight average molecular weight, prior to functionalization, of 10,000 to 5,000,000 g/cc, preferably 80,000 to 500,000; and/or
6. an MWD ($M_w/M_n$) between 1.5 to 40.0, more preferably between about 1.8 to 5 and most preferably between 1.8 to 3; and/or
7. a Mooney viscosity ML (1+4)@125° C. less than 100, more preferably less than 75, even more preferably less than 60, most preferably less than 30.

In another embodiment, prior to functionalization, preferred propylene copolymer preferably comprises a random crystallizable copolymer having a narrow compositional distribution. The intermolecular composition distribution of the polymer, may be determined by thermal fractionation in a solvent such as a saturated hydrocarbon e.g., hexane or heptane. This thermal fractionation procedure is described below. By having a narrow compositional distribution, it is meant that approximately 75% by weight and more preferably 85% by weight of the polymer is isolated as one or two adjacent, soluble fraction with the balance of the polymer in immediately preceding or succeeding fractions. Thus in a copolymer having a narrow compositional distribution, each of these fractions may have a composition (wt. % ethylene content) with a difference of no greater than 20% (relative to each other) and more preferably 10% (relative to each other) of the average weight % ethylene content of the polypropylene copolymer.

The length and distribution of stereoregular propylene sequences in preferred polypropylene copolymers is consistent with substantially random statistical copolymerization. It is well known that sequence length and distribution are related to the copolymerization reactivity ratios. By substantially random, we mean copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer may be determined by $^{13}C$ NMR, as is discussed in detail below, which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred polypropylene copolymers.

Preferred propylene copolymers to be functionalized and used herein are described in detail as the "Second Polymer Component (SPC)" in U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice.

IN another preferred embodiment, the polymer to be functionalized comprises propylene, one or more comonomers (such as ethylene, alpha-olefins having 4 to 8 carbon atoms, and styrenes) and optionally one or more α, ω dienes. The amount of diene is preferably no greater than about 10 wt %, more preferably no greater than about 5 wt %. Preferred dienes include those used for vulcanization of ethylene propylene rubbers, preferably ethylidene norbornene, vinyl norbornene, dicyclopentadiene, and 1,4-hexadiene (available from DuPont Chemicals).

In another embodiment, the polypropylene copolymer prior to functionalization may be a blend of discrete polymers. Such blends may include two or more polypropylene—polyethylene copolymers (as described above), two or more polypropylene copolymers (as described above), or at least one of each such polyethylene copolymer and polypropylene copolymer, where each of the components of the polymer blend would individually qualify as a polymer component.

It is understood in the context of the present invention that, in one embodiment, more than one polymer component may be used in a single blend. Each of the polymer components is described above and the number of polymer components in this embodiment is less than three and more preferably, two. In this embodiment of the invention the polymer components differ in the α-olefin content with one being in the range of 7 to 13 mole % olefin while the other is in the range of 14 to 22 mole % olefin. The preferred olefin is ethylene. It is believed that the use of two-polymer components leads to beneficial improvements in the tensile-elongation properties of the blends.

In another embodiment the polymer to be functionalized comprises random copolymers (RCP) and or impact copolymers (ICP) also called heterophasic copolymers or block copolymers. RCPs are usually produced by copolymerizing in a single reactor process propylene with other monomers such as ethylene, butene and higher alpha-olefins, the most common one being ethylene. Typical ethylene content for these copolymers range from 3-4 mole % up to 14-17 mole %. In a preferred embodiment, propylene polymers to be functionalized and used herein have an isotactic index and triad tacticity determined as follows:

Triad Tacticity

The term "tacticity" refers to the stereogenicity in a polymer. For example, the chirality of adjacent monomers can be of either like or opposite configuration. The term "diad" is used to designate two contiguous monomers; three adjacent monomers are called a triad. If the chirality of adjacent monomers is of the same relative configuration, the diad is called isotactic; if opposite in configuration, it is termed syndiotactic. Another way to describe the configurational relationship is to term contiguous pairs of monomers having the same chirality as meso (m) and those of opposite configuration racemic (r).

When three adjacent monomers are of the same configuration, the stereoregularity of the triad is 'mm'. If two adjacent monomers in a three-monomer sequence have the same chirality and that is different from the relative configuration of the third unit, this triad has 'mr tacticity. An 'a' triad has the middle monomer unit having an opposite configuration from either neighbor. The fraction of each type of triad in the polymer can be determined and when multiplied by 100 indicates the percentage of that type found in the polymer.

As indicated above, the reactivity ratios and sequence distribution of the polymer may be determined by $^{13}C$ NMR, which locates the ethylene residues in relation to the neighboring propylene residues. The triad tacticity can be determined from a $^{13}$C NMR spectrum of the propylene copolymer. The $^{13}$C NMR spectrum is measured in the following manner.

To measure the $^{13}$C NMR spectrum, 250-350 mg of the copolymer is completely dissolved in deuterated tetrachloroethane in a NMR sample tube (diameter: 10 mm) at 120° C. The measurement is conducted with full proton decoupling using a 90° pulse angle and at least a 15 second delay between pulses.

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm). Each peak in the spectrum was assigned with reference to literature source such as the articles in, "Polymer" 30 (1989) 1350 or "Macromolecules", 17 (1984) 1950 which are frilly incorporated by reference.

In the first region, the signal of the center methyl group in a PPP (mm) triad is located.

In the second region, the signal of the center methyl group in a PPP (mr) triad and the methyl group of a propylene unit whose adjacent units are a propylene unit and an ethylene unit resonates (PPE-methyl group).

In the third region, the signal of the center methyl group in a PPP (a) triad and the methyl group of a propylene unit whose adjacent units are ethylene units resonate (EPE-methyl group).

PPP (mm), PPP (mr) and PPP (a) have the following three-propylene units-chain structure with head-to-tail bonds, respectively. This is shown in the Fischer projection diagrams below.

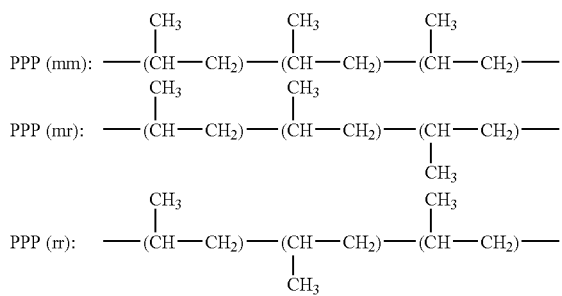

The triad tacticity (mm fraction) of the propylene copolymer can be determined from a $^{13}$C-NMR spectrum of the propylene copolymer and the following formula:

$$mm\ \text{Fraction} = \frac{PPP\ (mm)}{PPP\ (mm) + PPP(mr) + PPP(rr)}$$

The peak areas used in the above calculation are not measured directly from the triad regions in the $^{13}$C-NMR spectrum. The intensities of the mr and a triad regions need to have subtracted from them the areas due to EPP and EPE sequencing, respectively. The EPP area can be determined from the signal at 30.8 ppm after subtracting from it one half the area of the sum of the signals between 26 and 27.2 ppm and the signal at 30.1 ppm. The area due to EPE can be determined from the signal at 33.2 ppm.

In addition to the above adjustments to the mr and rr regions for the presence of EPP and EPE, other adjustments need to be made to these regions prior to using the above formula. These adjustments are needed to account for signals present due to non-head-to-tail propylene additions. The area of the mr region may be adjusted by subtracting one half of the area between 34 and 36 ppm and the area of the rr region may be adjusted by subtracting the intensity found between 33.7 and 40.0 ppm. Therefore, by making the above adjustments to the mr and rr regions the signal intensities of the mm, mr and rr triads can be determined and the above formula applied.

Preferred propylene ethylene copolymers useful in this invention have unique propylene tacticity as measured by % meso triad. As shown in detail in U.S. Ser. No. 09/108,772, filed Jul. 1, 1998, fully incorporated herein by reference, the copolymers have a lower % meso triad for any given ethylene content when compared to U.S. Pat. No. 5,504,172. The lower content of % meso triads corresponds to relatively lower crystallinity that translates into better elastomeric properties such as high tensile strength and elongation at break coupled with very good elastic recovery.

In another embodiment, preferred polylefins to be functionalized and used herein include those described in WO 02/083753. Preferably the polyolefins is a copolymer comprising 5 to 25% by weight of ethylene-derived units and 95 to 75% by weight of propylene-derived units, the copolymer having:

(a) a melting point of less than 90° C.;
(b) a relationship of elasticity to 500% tensile modulus such that Elasticity≦0.935M+12, where elasticity is in percent and M is the 500% tensile modulus in MPa; and
(c) a relationship of flexural modulus to 500% tensile modulus such that Flexural Modulus≦4.2e$^{0.27M}$+50, where flexural modulus is in MPa and M is the 500% tensile modulus in MPa, here tensile modulus and flexural modulus are determined as stated in WO 02/083753.

The functionalized component may be mixed or blended with (i.e., in combination with, an admixture of, and the like) POA having no graft component, a different graft component, or a similar graft component at a different level of inclusion, and/or the like, to achieve a final adhesive composition with a desired level of adhesion for a particular end use or process.

In an embodiment, in addition to the propylene copolymer, the functionalized component may also include an alpha-olefin homopolymer or copolymer containing no graft component. If desired, the alpha-olefin homopolymers may have various molecular weight characteristics, may be random and/or block copolymers of alpha-olefins themselves. Examples of the alpha-olefin include ethylene and alpha-olefins having 4 to 20 carbon atoms in addition to propylene. The homopolymers and copolymers of these alpha-olefins can be manufactured by various known methods, and may be commercially available under various trade names.

In the process utilized for producing the functionalized components and the final blends, no particular restriction need be put on a mixing manner, accordingly, the raw materials may be mixed uniformly by means of a Henschel mixer or the like and then may be melted, mixed and molded into pellets by an extruder or the like. It is also possible to utilize a Brabender mixer by which mixing and melting are carried out simultaneously, and after the melting, the material can be directly molded into films, sheets, or the like. Thus, the blends described herein may be formed using conventional techniques known in the art such that blending may be accomplished using one or more static mixers, in-line mixers, elbows, orifices, baffles, or any combination thereof.

In a preferred embodiment the POA and the functionallized component are combined in a weight to weight ratio of POA to functionalized component in the range of about 1:1000 to 1000:1. Preferably the weight to weight ratio may be about 1:100, about 1:50, about 1:20, about 1:10, about 1:5, about 1:4, about 1:3, about 1:2, or about 1:1. Alternately, the weight to weight ratio may be about 100:1, about 50:1, about 20:1, about 10:1, about 5:1, about 4:1, about 3:1, or about 2:1.

Formulations

The composition comprising the admixture of components 1 and 2, as produced herein, may be used directly as an adhesive, or may be blended, mixed and/or combined with other components to form an adhesive formulation.

Tackifiers may be used with the compositions of the present invention. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar. (Non-polar meaning that the tackifier is substantially free of monomers having polar groups. Preferably, the polar groups are not present, however if they are present, they are preferably not present at more that 5 weight %, preferably not more that 2 weight %, even more preferably no more than 0.5 weight %.) In some embodiments the tackifier may have a softening point (Ring and Ball, as measured by ASTM E-28) of 80° C. to 150° C., preferably 100° C. to 130° C. In another embodiment the resins is liquid and has a R and B softening point of between 10 and 70° C.

The tackifier, if present in the composition, may comprise about 1 to about 80 weight %, based upon the weight of the composition, more preferably 2 to 40 weight %, even more preferably 3 to 30 weight %.

Preferred hydrocarbon resins for use as tackifiers or modifiers include:
1. Resins such as $C_5/C_6$ terpene resins, styrene terpenes, alpha-methyl styrene terpene resins, $C_9$ terpene resins, aromatic modified $C_5/C_6$, aromatic modified cyclic resins, aromatic modified dicyclopentadiene based resins or mixtures thereof. Additional preferred resins include those described in WO 91/07472, U.S. Pat. Nos. 5,571,867, 5,171,793 and 4,078,132. Typically these resins are obtained from the cationic polymerization of compositions containing one or more of the following monomers: $C_5$ diolefins (such as 1-3 pentadiene, isoprene, and the like); $C_5$ olefins (such as 2-methylbutenes, cyclopentene, and the like); $C_6$ olefins (such as hexene), $C_9$ vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).
2. Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

Crosslinking Agents

In another embodiment an adhesive composition comprising polymer product of this invention may further comprises a crosslinking agent. Preferred crosslinking agents include those having functional groups that can react with the acid or anhydride group. Preferred crosslinking agents include alcohols, multiols, amines, diamines and/or triamines. Particular examples of crosslinking agents useful in this invention include polyamines such as ethylenediamine, diethylenetriamine, hexamethylenediamine, diethylaminopropylamine, and/or menthanediamine.

In another embodiment, the composition of this invention comprises one or more phenolic antioxidants. Preferred examples of a phenolic antioxidants include a substituted phenol such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate and pentaerythrityl-tetrakis-[3-(3,5-di-t-butyl-4-hydroxyphenyl)]propionate.

The amount of each of these additives to be added is such that the weight ratio of the additive to the functionalized propylene homopolymer of copolymer is preferably 1/1000 to 1/100000, more preferably 1/500 to 1/10000.

To the above-mentioned composition, there can be added a neutralizing agent such as calcium stearate, magnesium hydroxide, aluminum hydroxide or hydrotalcite, and a nucleating agent such as a salt of benzoic acid, sodium-2,2'-methylene-bis(4,6-di-t-butylphenyl)phosphate and benzyl sorbitol, and the like, in addition to the above-mentioned stabilizer.

Additives

In another embodiment, an adhesive composition of this invention further comprises typical additives known in the art such as fillers, antioxidants, adjuvants, adhesion promoters, oils, and/or plasticizers. Preferred fillers include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or napthenic oils such as Primol 352, or Primol 876 available from ExxonMobil Chemical France, S.A. in Paris, France. Preferred plasticizers include polybutenes, such as Parapol 950 and Parapol 1300 formerly available from ExxonMobil Chemical Company in Houston Tex. Other preferred additives include block, antiblock, pigments, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75(Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

In another embodiment the adhesive composition may be combined with less than 3 wt % anti-oxidant, less than 3 wt % flow improver, less than 10 wt % wax, and or less than 3 wt % crystallization aid.

Other optional components that may be combined with the adhesive composition as disclosed herein include plasticizers, and/or other additives such as oils, surfactants, fillers, color masterbatches, and the like. Preferred plasticizers include mineral oils, polybutenes, phthalates and the like. Particularly preferred plasticizers include phthalates such as di-iso-undecyl phthalate (DIUP), di-iso-nonylphthalate (DINP), dioctylphthalates (DOP) and/or the like. Particularly preferred oils include aliphatic naphthenic oils.

Other optional components that may be combined with the polymer product of this invention are low molecular weight products such as wax, oil or low Mn polymer, (low meaning below Mn of 5000, preferably below 4000, more preferably below 3000, even more preferably below 2500). Preferred waxes include polar or non-polar waxes, polypropylene waxes, polyethylene waxes, and wax modifiers. Preferred waxes include ESCOMER™ 101. Preferred oils include aliphatic napthenic oils, white oils or the like. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220 cSt at 100° C., as measured by ASTM D 445. In some embodiments the polar and non-polar waxes are used together in the same composition.

In some embodiments, however, wax may not be desired and is present at less than 5 weight %, preferably less than 3 weight %, more preferably less than 1 weight %, more preferably less than 0.5 weight %, based upon the weight of the composition.

In another embodiment the composition of this invention may have less than 30 weight % total of any combination of additives described above, preferably less than 25 weight %, preferably less than 20 weight %, preferably less than 15 weight %, preferably less than 10 weight %, preferably less than 5 weight %, based upon the total weight of component 1 and component 2, and the additives.

In another embodiment, the composition of this invention may be blended with elastomers (preferred elastomers include all natural and synthetic rubbers, including those defined in ASTM D1566). In a preferred embodiment, elastomers may be blended with the composition of the present invention to form rubber toughened compositions. In a particularly preferred embodiment, the rubber toughened composition is a two (or more) phase system where the rubber is a discontinuous phase and the inventive composition forms the continuous phase. Examples of preferred elastomers include one or more of the following: ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the adhesive composition may be blended with impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the combination of component 1 and component 2 as described above, is the continuous phase.

In another embodiment the polymer produced by this invention may be blended with ester polymers. In a preferred embodiment the blend is a two (or more) phase system where the polyester is a discontinuous phase and the composition is the continuous phase.

The composition of this invention or formulations thereof may then be applied directly to a substrate or may be sprayed thereon. The composition may be molten, or heated to a semisolid state prior or during application. Spraying is defined to include atomizing, such as producing an even dot pattern, spiral spraying such as Nordson Controlled Fiberization or oscillating a stretched filament like may be done in the ITW Dynafiber/Omega heads or Summit technology from Nordson. The compositions of this invention may also be melt blown. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, alpha.methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the polymer and the unsaturated acid or anhydride. In a preferred embodiment the unsaturated acid or anhydried comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof.

Tackifiers

In a preferred embodiment, the adhesives of this invention further comprise a tackifier, preferably present at about 1 to about 80 weight %, based upon the weight of the blend, more preferably 2 to 40 weight %, even more preferably 3 to 30 weight %; based upon the weight of the adhesive.

Examples of suitable tackifiers for use in this invention include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In an embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 150° C., preferably 100° C. to 130° C. In another embodiment the resins is liquid and has a R and B softening point of between 10 and 70° C.

Preferred hydrocarbon resins for use as tackifiers include:
1. Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. Nos. 5,571, 867, 5,171,793 and 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).
2. Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

The hydrocarbon resins (tackifiers) obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

The Adhesive Blend

The adhesive blends prepared herein may be prepared by any conventional blending means known in the art.

In another embodiment the adhesive composition further comprises a crosslinking agent. Preferred crosslinking agents include those having functional groups that can react with the acid or anhydride group. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaminopropylamine, and/or menthanediamine.

In another embodiment the adhesive composition further comprises typical additives known in the art such as fillers, antioxidants, adjuvants, adhesion promoters, oils, plasticizers, block, antiblock, pigments, dyes, processing aids, UV stabilizers, neutralizers, lubricants, surfactants, nucleating agents, synergists, polymeric additives, defoamers, preservatives, thickeners, rheology modifiers, humectants, fillers and/or water, Preferred fillers include titanium dioxide, calcium carbonate, barium sulfate, silica, silicon dioxide, carbon black, sand, glass beads, mineral aggregates, talc, clay, and the like.

Preferred antioxidants include phenolic antioxidants, such as Irganox 1010, Irganox, 1076 both available from Ciba-Geigy. Particularly preferred antioxidants include those selected from the group consisting of thioesters, phosphates, hindered phenols, tetrakis (methylene 3-(3',5'-di-t-butyl-4 hydroxyphenyl)propionate)methane, 2,2'-ethyldenebis (4,6-di-tertiarybutylphenol), 1,1-3-tris (2-methyl-4-hydroxy-5-t-butylephenyl)butane, 1,3,5-trimethyl2,4,6,tris (3,5-tertbutyl-4-hydroxybenzyl)benzene, dilaurylthiodipropionate, pentaerythritol tetrakis (beta-laurylthiopropionate), alkylaryldi- and polyphosphates, thiophosphites, and combinations or derivatives thereof. Particularly preferred plasticizers include di-iso-undecyl phthalate (DIUP), di-iso-nonylphthalate (DINP), dioctylphthalates (DOP), combinations thereof, or derivatives thereof.

Preferred oils include paraffinic or napthenic oils such as Primol 352, or Primol 876 available from ExxonMobil Chemical France, S.A. in Paris, France. Preferred oils also include aliphatic napthenic oils, white oils or the like.

Preferred plasticizers include polybutenes, such as Parapol 950 and Parapol 1300 formerly available from ExxonMobil Chemical Company in Houston Tex., mineral oils, polybutenes, phthalates and the like. Particularly preferred plasticizers include phthalates such as di-iso-undecyl phthalate (DIUP), di-iso-nonylphthalate (DINP), dioctylphthalates (DOP) and the like. Particularly preferred oils include aliphatic naphthenic oils.

Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75(Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

In an embodiment the adhesive composition comprises less than 3 wt % anti-oxidant, less than 3 wt % flow improver, less than 10 wt % wax, and or less than 3 wt % crystallization aid.

In another embodiment the adhesive composition comprises low molecular weight products such as wax, oil or low Mn polymer, (low meaning below Mn of 5000, preferably below 4000, more preferably below 3000, even more preferably below 2500). Preferred waxes include polar or non-polar waxes, polypropylene waxes, polyethylene waxes, and wax modifiers. Preferred waxes include ESCOMER™ 101. Particularly preferred waxes are selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof.

Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220 cSt at 100° C., as measured by ASTM D 445. In some embodiments the polar and non-polar waxes are used together in the same composition.

In some embodiments, however, wax may not be desired and is present at less than 5 weight %, preferably less than 3 weight %, more preferably less than 1 weight %, more preferably less than 0.5 weight %, based upon the weight of the composition.

In another embodiment the polymers of this invention have less than 30 weight % total of any combination of additives described above, preferably less than 25 weight %, preferably less than 20 weight %, preferably less than 15 weight %, preferably less than 10 weight %, preferably less than 5 weight %, based upon the weight of the polymer and the additives.

In another embodiment the adhesive compositions of this invention are blended with elastomers (preferred elastomers include all natural and synthetic rubbers, including those defined in ASTM D1566). Examples of preferred elastomers include one or more of the following: ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the adhesive composition produced by this invention may be blended with impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the polymer is a continuous phase.

In another embodiment the adhesive composition produced by this invention may be blended with ester polymers. In a preferred embodiment the blend is a two (or more) phase system where the polyester is a discontinuous phase and the polymer is a continuous phase.

In a preferred embodiment the adhesive composition is combined with metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; WO91/09882; WO94/03506 and U.S. Pat. No. 5,055,438.

In another embodiment the adhesive composition are blended with a homopolymer and/or copolymer, including but not limited to, homopolypropylene, propylene copolymerized with up to 50 weight % of ethylene or a C4 to C20 alpha.-olefin, isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$ low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

In a preferred embodiment the adhesive composition of this invention is present in the blend (of adhesive composition and one or more polymers) at from 10 to 99 weight %, based upon the weight of the adhesive composition and the polymers in the blend, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

Properties of the Adhesive Composition

The adhesive compositions prepared herein preferably show substrate fiber tear at −10° C. when the adhesive is applied to 56 pound virgin high performance parerboard stock (available from Inland Paper, Rome Ga.), preferably at least 5%, more preferably at least 10%, more preferably at least 20%, more preferably at least 30%, more preferably at least 40%, more preferably at least 50%, more preferably at least 60%, more preferably at least 70%, more preferably at least 80%, more preferably at least 90%, more preferably 100%.

In another embodiment the adhesive prepared herein has a viscosity (also referred to a Brookfield Viscosity or Melt Viscosity) of 90,000 mPa·sec or less at 190° C. (as measured by ASTM D 3236 at 190° C.; ASTM=American Society for Testing and Materials); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the viscosity is 50,000 mPa·sec or less depending on the applications.

In another embodiment the adhesive composition prepared herein has a heat of fusion of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g.

In another embodiment the adhesive composition prepared herein also has a Shore A Hardness (as measured by ASTM 2240) of 95 or less, 70 or less, or 60 or less, or 50 or less, or 40 or less or 30 or less, or 20 or less. In other embodiments the Shore A Hardness is 5 or more, 10 or more, or 15 or more. In certain applications, such as packaging, the Shore A Hardness is preferably 50-85. In another embodiment, the polymer has a Shore A hardness of 20-90.

In another embodiment the adhesive composition prepared herein has a Shear Adhesion Fail Temperature (SAFT—as measured by ASTM 4498) of 200° C. or less, or of 40 to 150° C., or 60 to 130° C., or 65 to 110° C., or 70-80° C. In certain embodiments SAFT's of 130-140° C. are preferred. In other embodiments, SAFT's of 100-130° C. are preferred. In other embodiments, SAFT's of 110-140° C. are preferred.

In another embodiment the adhesive composition prepared herein also has a Dot T-Peel on Kraft paper of between 1 Newton and 10,000 Newtons, or 3 and 4000 Newtons, or between 5 and 3000 Newtons, or between 10 and 2000 Newtons, or between 15 and 1000 Newtons. Dot T-Peel is determined according to ASTM D 1876, as described below.

In another embodiment the adhesive composition prepared herein has a set time of several days to 1 second, or 60 seconds or less, or 30 seconds or less, or 20 seconds or less, or 15 seconds or less, or 10 seconds or less, or 5 seconds or less, or 4 seconds or less, or 3 seconds or less, or 2 seconds or less, or 1 second or less.

In another embodiment the adhesive composition prepared herein has a strain at break (as measured by ASTM D-1708 at 25° C.) of 50 to 1000%, preferably 80 to 200%. In some other embodiments the strain at break is 100 to 500%.

In another embodiment, the adhesive composition prepared herein has a tensile strength at break (as measured by ASTM D-1708 at 25° C.) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

In another embodiment the adhesive compositions prepared herein have a cloud point of 200° C. or less, preferably 180° C. or less, preferably 160° C. or less, preferably 120° C. or less, preferably 100° C. or less. Likewise any composition that the POA is part of preferably has a cloud point of 200° C. or less, preferably 180° C. or less, preferably 160° C. or less, preferably 120° C. or less, preferably 100° C. or less.

In another embodiment the adhesive compositions prepared herein have a Peel Strength on MYLAR at 25° C. of and a separation speed of 5 cm per minute of 0.05 lb/in or more, preferably 1 lb/in or more, preferably 5 lb/in for more, preferably 10 lb/in or more.

In another embodiment the adhesive compositions prepared herein have a Peel Strength on polypropylene at 25° C. of and a separation speed of 5 cm per minute of 0.05 lb/in or more, preferably 1 lb/in or more, preferably 5 lb/in for more, preferably 10 lb/in or more.

In another embodiment the adhesive compositions prepared herein have a Peel Strength on propylene at −10° C. of and a separation speed of 5 cm per minute of 0.05 lb/in or more, preferably 1 lb/in or more, preferably 5 lb/in for more, preferably 10 lb/in or more.

In another embodiment the adhesive compositions prepared herein have a Peel Strength on acrylic coated freezer paper at −18° C. of and a separation speed of 5 cm per minute 0.05 lb/in or more, preferably 1 lb/in or more, preferably 5 lb/in for more, preferably 10 lb/in or more.

In another embodiment, the adhesive prepared herein has deflection (measured in millimeters) of at least 100% greater than the same adhesive without the functional component (preferably 150% greater, more preferably 200% greater, more preferably 250% greater, more preferably 300% greater, more preferably 350% greater, more preferably 400% greater, more preferably 500% greater, more preferably 600% greater) as measured by the following Three Point Bend procedure:

The adhesive "structure" is placed on top of 2 parallel, cylindrical bars of diameter 5 mm, separated by 33 mm. The long axis of the "structure" is perpendicular to the direction of the bars. The temperature is equilibrated at "T"° C. A third bar is lowered down onto the "structure" in the centre to deflect it downwards. The deflection is measured to the break point of the "structure" or recorded as the maximum deflection of the apparatus. Definitions: "structure" is defined as a rectangular construction of 50 mm long, 6 mm wide and between 400 and 600 microns thick. "T" is chosen to best represent the operating conditions of the adhesive. In this case temperatures of −10° C. and −18° C. are typical values. "structure" preparation:

It is desired to make the "structure" as closely as possible to the method used to prepare the adhesive bond. In this case the adhesive was applied hot at a temperature of 180° C. onto release paper. A firm structure, coated in release paper, applied to the top of the adhesive in order to sandwich it between the two release papers. It was immediately rolled with a 1 kg PSA roller to compress the bond. When the bond is cooled, the adhesive is removed from between the two release papers and carefully cut to the desired dimensions.

For purposes of this invention and the claims thereto, the following tests are used, unless otherwise indicated.

Tensile strength, Tensile strength at break and elongation at break are measured by ASTM D 1708. Elongation at break is also called strain at break or percent elongation.

Peel strength –ASTM D-1876 (also referred to as Peel adhesion at 180° peel angle, 180° peel strength, 180° peel adhesion, T-Peel strength, T-Peel.) Dynamic Storage modulus also called storage modulus is G'.

Creep resistance ASTM D-2293

Rolling Ball Tack PSTC 6

Hot Shear Strength is determined by suspending a 1000 gram weight from a 25 mm wide strip of MYLAR polyester film coated with the polymer or adhesive formulation which is adhered to a stainless steel plate with a contact area of 12.5 mm×25 mm. The sample is placed in a ventilated oven at 40° C. time is recorded until stress failure occurs.
Probe tack (also called Polyken probe tack) ASTM D 2979
Holding Power—PSTC 7, also called Shear adhesion or Shear strength?.
Density—ASTM D792 at 25° C.
Gardner color ASTM D 1544-68.
SAFT is also called heat resistance.
Tensile Strength Modulus at 100% elongation and Young's Modulus are determined according to ASTM E-1876.
Luminence is the reflectance "Y" in the CIE color coordinates as determined by ASTM D 1925 divided by 100.
Needle penetration is measured by ASTM D5.
Sag is also referred to as creep.
Bond strength is measured by ASTM D3983.
Adhesion to road surface is measured by ASTM D4541.

The adhesives of this invention can be used in any adhesive application, including but not limited to, disposables, packaging, laminates, pressure sensitive adhesives, tapes, labels, wood binding, paper binding, non-wovens, road marking, reflective coatings, and the like.

In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

The adhesive compositions described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spunbonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or the adhesive composition of this invention, may be corona discharge treated, flame treated, electron beam irradiated, gamma irradiated, microwaved, or silanized before or after the substrate and the adhesive composition are combined.

In preferred embodiments, the blends of this invention are heat stable, by which is meant that the Gardner color of the composition (as determined by ASTM D-1544-68) that has been heat aged (e.g., maintained) at or 180° C. for 48 hours, does not change by more than 7 Gardner units when compared to the Gardner color of the initial composition. Preferably, the Gardner color of the composition after heating above its melting point for 48 hours does not change by more than 6, more preferably 5, still more preferably 4, still more preferably 3, still more preferably 2, still more preferably 1 Gardner color unit, as compared to the initial composition prior to being heated.

It has been discovered that free acid groups present in the composition may result in reduced heat stability. Accordingly, in a preferred embodiment, the amount of free acid groups present in the blend is less than about 1000 ppm, more preferably less than about 500 ppm, still more preferably less than about 100 ppm, based on the total weight of the blend. In yet another preferred embodiment, the composition is essentially free from phosphites, preferably the phosphites are present at 100 ppm or less.

In another embodiment this invention is also useful at low temperatures.

In another embodiment, this invention relates to:
1. An adhesive comprising 1) functionalized component and 2) an olefin polymer comprising 50 weight % or more of an alpha-olefin having 3 to 30 carbon atoms, where the olefin polymer has a Dot T-Peel of 1 N or more on Kraft paper, an Mw of 10,000 to 100,000, a g' measured at the Mz of 0.95 or less and a heat of fusion of 1 to 70 J/g; where the functionalized component is selected from the group consisting of functionalized polymers, functionalized oligomers and beta nucleating agents; and where the Gardner color of the adhesive does not change by more than 7 Gardner units when the adhesive has been heat aged at 180° C. for 48 hours as compared to the Gardner color of the unaged composition.
2. An adhesive comprising 1) functionalized component and 2) an olefin polymer comprising 50 weight % or more of one or more alpha-olefins having 3 to 30 carbon atoms, where the olefin polymer has a Dot T-Peel of 1 N or more, an Mw of 10,000 to 60,000, a g' measured at the Mz of 0.98 or less, and a heat of fusion of 1 to 50 J/g; where the functionalized component is selected from the group consisting of functionalized polymers, functionalized oligomers and beta nucleating agents; and where the Gardner color of the adhesive does not change by more than 7 Gardner units when the adhesive has been heat aged at 180° C. for 48 hours as compared to the Gardner color of the unaged composition.
3. An adhesive comprising 1) functionalized component and 2) an olefin polymer comprising a homopolypropylene or a copolymer of propylene and up to 5 mole % ethylene having:
   a) an isotactic run length of 1 to 30,
   b) a percent of r dyad of greater than 20%, and
   c) a heat of fusion of 70 J/g or less;
where the functionalized component is selected from the group consisting of functionalized polymers, functionalized oligomers and beta nucleating agents; and where the Gardner color of the adhesive does not change by more than 7 Gardner units when the adhesive has been heat aged at 180° C. for 48 hours as compared to the Gardner color of the unaged composition.
4. The adhesive of paragraph 1, 2 or 3 wherein the olefin polymer has a percent crystallinity of between 5 and 40% or less.
5. The adhesive of any of the above paragraphs wherein the g' is 0.90 or less.
6. The adhesive of any of the above paragraphs wherein the g' is 0.80 or less.
7. The adhesive of any of the above paragraphs wherein the olefin polymer has a viscosity at 190° C. of 90,000 mPa·s or less.
8. The adhesive of any of the above paragraphs wherein the olefin polymer has a viscosity at 160° C. of 8,000 mPa·s or less.
9. The adhesive of any of the above paragraphs wherein the olefin polymer has a heat of fusion greater than 10 J/g.

10. The adhesive of any of the above paragraphs wherein the olefin polymer has heat of fusion of from 20 to 70 J/g.
11. The adhesive of any of the above paragraphs wherein the olefin polymer has heat of fusion of from 30 to 60 J/g.
12. The adhesive of any of the above paragraphs wherein the olefin polymer has a percent crystallinity of 10-30%.
13. The adhesive of any of the above paragraphs wherein the olefin polymer has tensile strength at break of 0.75 MPa or more.
14. The adhesive of any of the above paragraphs wherein the olefin polymer has a SAFT of 100-130° C.
15. The adhesive of any of the above paragraphs wherein the olefin polymer has an Mz/Mn of 2 to 200.
16. The adhesive of any of the above paragraphs wherein the olefin polymer has a Shore A hardness of 20-90.
17. The adhesive of any of the above paragraphs wherein the olefin polymer has a Dot T-Peel of between 3 and 10,000 N.
18. The adhesive of any of the above paragraphs wherein the olefin polymer has a Dot T-Peel of between 10 and 2,000 N.
19. The adhesive of any of the above paragraphs wherein the olefin polymer has a tensile strength at break of 0.6 MPa or more.
20. The adhesive of any of the above paragraphs wherein the olefin polymer has a Tg of between 5 and −65° C.
21. The adhesive of any of the above paragraphs wherein the olefin polymer comprises at least 50 weight % propylene.
22. The adhesive of any of the above paragraphs wherein the olefin polymer comprises at least 50 weight % propylene and up to 50 weight % of a comonomer selected from the group consisting of ethylene, butene, hexene, octene, decene, dodecene, pentene, heptene, nonene, 4-methyl-pentene-1,3-methyl pentene-1, 3,5,5-trimethyl-hexene-1, and 5-ethyl-1-nonene.
23. The adhesive of any of the above paragraphs wherein the olefin polymer comprises at least 50 weight % propylene and 5 weight % or less of ethylene.
24. The adhesive of any of the above paragraphs wherein the olefin polymer comprises up to 10 weight % of a diene selected from the group consisting of: butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, and dicyclopentadiene.
25. The adhesive of any of the above paragraphs wherein tackifier is present at 1 to 60 weight %.
26. The adhesive of any of the above paragraphs wherein tackifier is present and is selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.
27. The adhesive of any of the above paragraphs wherein the adhesive further comprises one or more waxes selected from the group consisting of polar waxes, non-polar waxes, Fischer-Tropsch waxes, oxidized Fischer-Tropsch waxes, hydroxystearamide waxes, polypropylene waxes, polyethylene waxes, wax modifiers, and combinations thereof
28. The adhesive of any of the above paragraphs wherein the adhesive further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.
29. The adhesive of any of the above paragraphs wherein the adhesive further comprises one or more aliphatic naphthenic oils, white oils, combinations thereof, or derivatives thereof.
30. The adhesive of any of the above paragraphs wherein the adhesive further comprises one or more plasticizers selected from the group consisting of mineral oils, polybutenes, phthalates, and combinations thereof.
31. The adhesive of any of the above paragraphs wherein the adhesive further comprises one or more plasticizers selected from the group consisting of di-iso-undecyl phthalate, di-iso-nonylphthalate, dioctylphthalates, combinations thereof, or derivatives thereof.
32. The adhesive of any of the above paragraphs wherein the olefin polymer has a peak melting point between 80 and 140° C.
33. The adhesive of any of the above paragraphs wherein the olefin polymer has a Tg of 0° C. or less.
34. The adhesive of any of the above paragraphs wherein the olefin polymer has a melt index of 50 dg/min or more.
35. The adhesive of any of the above paragraphs wherein the olefin polymer has a set time of 30 seconds or less.
36. The adhesive of any of the above paragraphs wherein the olefin polymer has a Tc that is at least 10° C. below the Tm.
37. The adhesive of any of the above paragraphs wherein the olefin polymer has an $I_{10}/I_2$ of 6.5 or less.
38. The adhesive of any of the above paragraphs wherein the olefin polymer has a range of crystallization of 10 to 60° C. wide.
39. The adhesive of any of the above paragraphs wherein the functionalized component is present at 0.001 to 50 weight %.
40. The adhesive of any of the above paragraphs wherein the functionalized component is present at 0.1 to 10 weight %.
41. The adhesive of any of the above paragraphs wherein the functionalized component comprises functionalized polymer.
42. The adhesive of any of the above paragraphs wherein the functionalized component comprises functionalized polymer selected from the group consisting of maleated polyethylene, maleated metallocene polyethylene, maleated metallocene polypropylene, maleated ethylene propylene rubber, and functionalized polyisobutylene.
43. The adhesive of any of the above paragraphs wherein the functionalized component comprises functionalized oligomer.
44. The adhesive of any of the above paragraphs wherein the functionalized component comprises functionalized hydrocarbon resin.
45. The adhesive of any of the above paragraphs wherein the functionalized component comprises a beta-nucleating agent.
46. The adhesive of any of the above paragraphs wherein the functionalized component comprises beta nucleating agent selected from the group consisting of N,N'-diphenylhexanediamide, N,N'-dicyclohexylterephthalamide, N,N'-dicyclohexyl-2,6-naphthalenedicarboxamide, N,N'-dicyclohexanecabonyl-p-phenylenediamine, N,N'-dibenzoyl-1,5-diaminonaphthalene, N,N'-dibenzoyl-1,4-diaminocyclohexane or N,N'-dicyclohexanecarbonyl-1,4- diaminocyclohexane, N-cyclohexyl-4-(N-cyclohexylcarbonylamino)benzamide, N-phenyl-5-(N-benzoylamino)pentanamide, sorbitol, salicyclic acid, p-hydroxybenzoic acid, zinc 3,5-di-tert-butylsalicyclate, 2-naphthoic acid, phenyl acetic acid, terephthalic acid, anthranilic acid, 3,3-diphenylpropionic, tetra butyl ammonium chloride, naphthalic acid, benzoin, ascorbic acid, adipic acid, tertabutyl benzoate, dodecylbenzenesulfonic acid sodium salt, 4-dodecylbenzenesulfonic acid, 4,4-bis (4-hydroxyphenyl)valeric acid, diphenic acid, 4-isopropylbenzoic acid, Millad 3988tm, neodecanoic acid, abietic acid, sodium benzoate, succinic anhydride, phenol, benzoic acid, benzyl alcohol, benzyl amine, alkyl substituted succinates (preferably C1 to C40 alkyl substituted succinates), substituted di(benzylidene)-D-sorbitols, 1,3:2,4-di (benzylidene)-D-sorbitol, 1,3:2,4-bis(3,4-dimethylbenzylidene)-D-sorbitol, red quinacridone dye, gamma-crystalline form of a quinacridone colorant, the bisodium salt of orthophthalic acid, the aluminum salt of 6-quinizarin sulfonic acid, the aluminum salt of isophthalic and the aluminum salt of terephthalic acids.

47. The adhesive of any of the above paragraphs wherein the functional component comprises a functional group selected from the group consisting of organic acids, organic amides, organic amines, organic esters, organic anhydrides, organic alcohols, organic acid halides, organic peroxides, and salts thereof.

48. The adhesive of any of the above paragraphs wherein the functional component comprises a functional group selected from the group consisting of carboxylic acids, esters of the unsaturated carboxylic acids, acid anhydrides, di-esters, salts, amides, imides, aromatic vinyl compounds hydrolyzable unsaturated silane compounds and unsaturated halogenated hydrocarbons.

49. The adhesive of any of the above paragraphs wherein the functional component comprises a functional group selected from the group consisting of maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, 1o-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo (2.2.1)hept-5-ene-2,3-dicarboxylic acid anhydride (XMNA).

50. The adhesive of any of the above paragraphs wherein the functional component comprises a functional polymer where the polymer of the functional polymer is syndiotactic polypropylene.

51. The adhesive of any of the above paragraphs wherein the functional component comprises a functional polymer where the polymer of the functional polymer is syndiotactic rich polypropylene.

52. The adhesive of any of the above paragraphs wherein the functional component comprises a functional polymer where the polymer of the functional polymer is polypropylene having a weight average molecular weight of 15,000 or less and a crystallinity of 5% or more.

53. The adhesive of any of the above paragraphs wherein the functional component comprises a functional polymer where the polymer of the functional polymer is polypropylene having a weight average molecular weight between 3,000 to 15,000 and a crystallinity of 5% or more functionalized with up to 10 weight % of maleic anhydride.

54. The adhesive of any of the above paragraphs wherein the functional component comprises a functional polymer where the polymer of the functional polymer is polypropylene having:
   1) a heat of fusion from about 0.5 J/g to about 25 J/g; and/or
   2) a crystallinity of about 0.25% to about 15%; and/or
   3) a melting point of from about 25° C. to about 75° C.; and/or
   4) a weight average molecular weight, prior to functionalization, of 10,000 to 500,000; and/or
   5) an $M_w/M_i$, between 1.8 to 5; and/or
   6) a Mooney viscosity ML (1+4)@125° C. less than 100.

55. The adhesive of any of the above paragraphs wherein the functional component comprises a functional polymer where the polymer of the functional polymer is syndiotactic rich polypropylene having at least 50% [r] dyads.

56. The adhesive of any of the above paragraphs wherein the functional component comprises a functional polymer where the polymer of the functional polymer is syndiotactic rich polypropylene having at less than or equal to 99% [r] dyads.

57. The adhesive of any of the above paragraphs wherein the functional component comprises a functional polymer where the polymer of the functional polymer is a random copolymer of propylene and an alpha olefin wherein the propylene copolymer has:
   a crystallinity of from 0.1 to 50%;
   a propylene content from 68 to 92 mole percent;
   a comonomer content from 8 to 32 mole percent;
   a melting point from 25° C. to 105° C.; and
   a heat of fusion of less than 45 J/g.

58. A process to make the adhesive of any of the above paragraphs, comprising the steps of contacting the olefin polymer with the functionalized component to produce an admixture.

59. A tie layer, paint primer, package, article, disposable article, diaper, film, laminate, pressure sensitive adhesive, hot melt adhesive, tape or nonwoven fabric comprising the adhesive of any of the above claims.

60. The adhesive of any of the above paragraphs wherein the adhesive shows substrate fiber tear at −10° C. when the adhesive is applied to 50 pound corrugated cardboard.

61. The adhesive of any of the above paragraphs wherein the adhesive shows substrate fiber tear at −10° C. of at least 5% when the adhesive is applied to 50 pound corrugated cardboard.

62. The adhesive of any of the above paragraphs wherein the adhesive has three point bend deflection at −10° C. of at least 100% greater than the same adhesive without the functional component.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

EXAMPLES

Characterization and Tests

Molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [Reference: T. Sun, P. Brant, R. R. Chance, and W. W. Graessley, *Macromolecules*, Volume 34, Number 19, 6812-6820, (2001)]; attached below are brief descriptions of the components.

The SEC with three Polymer Laboratories PLgel 10 mm Mixed-B columns, a nominal flow rate 0.5 cm$^3$/min, and a nominal injection volume 300 microliters was common to both detector configurations. The various transfer lines, columns and differential refractometer (the DRI detector, used mainly to determine eluting solution concentrations) were contained in an oven maintained at 135° C.

The LALLS detector was the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal was sent to a data acquisition board (National Instruments) that accumulates readings at a rate of 16 per second. The lowest four readings were averaged, and then a proportional signal was sent to the SEC-LALLS-VIS computer. The LALLS detector was placed after the SEC columns, but before the viscometer.

The viscometer was a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer was calculated from their outputs. The viscometer was inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index was measured using SEC with an on-line viscometer (SEC-VIS) and are reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = K M_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonmer is butene, branches of greater than two carbons should not be present). For a homopolymer of propylene, the GPC should not show branches of more than one carbon atom. When a linear standard is desired for a polymer where the comomoner is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR.

Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the curves were measured and used to determine the heat of fusion and the degree of crystallinity. The percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature.

The glass transition temperature (Tg) was measured by ASTM E 1356 using a TA Instruments model 2920 machine.

Melt Viscosity (ASTM D-3236) (also called "viscosity", "Brookfield viscosity")

Melt viscosity profiles were typically measured at temperatures from 120° C. to 190° C. using a Brookfield Thermosel viscometer and a number 27 spindle.

Adhesive Testing

A number of hot melt adhesives were prepared by using the pure polymers or blending the pure polymer, functionalized additives, tackifier, wax, antioxidant, and other ingredients under low shear mixing at elevated temperatures to form fluid melt. The mixing temperature varied from about 130 to about 190° C. Adhesive test specimens were created by bonding the substrates together with a dot of about 0.3 grams of molten adhesive and compressing the bond with a 500-gram weight until cooled to room temperature. The dot size was controlled by the adhesive volume such that in most cases the compressed disk which formed gave a uniform circle just inside the dimensions of the substrates.

Once a construct has been produced it can be subjected to various insults in order to assess the effectiveness of the bond. Once a bond fails to a paper substrate a simple way to quantify the effectiveness is to estimate the area of the adhesive dot that retained paper fibers as the construct failed along the bond line. This estimate was called percent substrate fiber tear. An example of good fiber, after conditioning a sample for 15 hours at −12° C. and attempting to destroy the bond, would be an estimate of 80-100% substrate fiber tear. It is likely that 0% substrate fiber tear under those conditions would signal a loss of adhesion.

Substrate fiber tear: The specimens were prepared using the same procedure as that described above. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear was expressed in percentage.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500-gram weight occupied about 1 square inch of area (1 inch=2.54 cm). Once made all the specimens were pulled apart in side by side testing at a rate of 2 inches per minute by a machine that records the destructive force of the insult being applied. The maximum force achieved for each sample tested was recorded and averaged, thus producing the average maximum force which is reported as the Dot T-Peel.

Peel Strength (modified ASTM D1876): Substrates (1×3 inches (25×76 mm)) were heat sealed with adhesive film (5 mils (130 μm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart is recorded.

Set time is defined as the time it takes for a compressed adhesive substrate construct to fasten together enough to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm)) was placed upon the dot 3 seconds later and compressed with a 500 gram weight. The weight was allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

SAFT (modified D4498) measures the ability of a bond to withstand an elevated temperature rising at 10° F. (5.5° C.)/15 min., under a constant force that pulls the bond in the shear mode. Bonds were formed in the manner described above on Kraft paper (1 inch by 3 inch (2.5 cm×7.6 cm)). The test specimens were suspended vertically in an oven at room temperature with a 500-gram load attached to the bottom. The temperatures at which the weight fell was recorded (when the occasional sample reached temperatures above the oven capacity >265° F. (129° C.) it was terminated and averaged in with the other samples at termination temperature).

Shore A hardness was measured according to ASTM D 2240. An air cooled dot of adhesive was subjected to the needle and the deflection was recorded from the scale.

The following materials were used in examples HM1 through HM50 listed in the following tables.

| Trade name | Description | Source |
| --- | --- | --- |
| Tackifiers | | |
| Escorez ® 5637 | Hydrogenated aromatic modified resin produced from dicyclopentadiene feedstock, exhibiting a ring and ball softening point of 130° C. | ExxonMobil Chemical Company |
| Escorez ® 5690 | hydrogenated aromatic modified resin produced from dicyclopentadiene feedstock, exhibiting a ring and ball softening point of 90° C. | ExxonMobil Chemical Company |
| Oils | | |
| Kadol oil | Refined white mineral oil | Witco |
| Polymers/Adhesives | | |
| Rextac RT 2715 | C3/C4 Ziegler Natta APAO | Huntsman, Odessa Texas |
| Henkel hot melt 80-8368 | Commercial blend of EVA, tackifier, and wax | Henkel Corp |

-continued

| Trade name | Description | Source |
|---|---|---|
| Advantra 9250 | Commercial blend of C2/C8 metallocene polymers, tackifiers, and wax | H. B. Fuller |
| Tite bond wood glue | Water based adhesive | Home Depot, Houston, Texas |
| VM-1000 | is a propylene ethylene copolymer (approx. ____ wt % C2) produced using a metallocene catalyst sold as VM-1000 | ExxonMobil Chemical Company |
| VM-2000 | is a propylene ethylene copolymer (approx. 14 wt % C2) produced using a metallocene catalyst sold as VM-2000 | ExxonMobil Chemical Company |
| VM-3000 | is a propylene ethylene copolymer (approx. 11 wt % C2) produced using a metallocene catalyst sold as VM-3000 | ExxonMobil Chemical Company |
| Waxes/Funtionalized additives | | |
| AC395A | Oxidized polyethylene with density of 1.0 g/cc, viscosity of 2500 cP at 150° C. and acid number of 45~50 mg/KOH/g. | Honeywell, Morristown, New Jersey |
| AC 596P | Polypropylene-maleic anhydride copolymer with viscosity 189 cps at 190° C. and Saponification number of 40 mg/KOH/g | Honeywell, Morristown, New Jersey |
| AC 597 | Polypropylene-maleic anhydride copolymer with viscosity 374 cps at 190° C. and Saponification number of 80 mg/KOH/g | Honeywell, Morristown, New Jersey |
| AC X1325 | Polypropylene-maleic anhydride copolymer with viscosity 1490 cps at 190° C. and acid number of 16 mg/KOH/g | Honeywell, Morristown, New Jersey |
| AC1302P | Ethylene-maleic anhydride copolymer with viscosity of 248 cP at 190° C. and Saponification number of 5 mg KOH/g | Honeywell, Morristown, New Jersey |
| PP-grafted maleic anhydride | PP-grafted maleic anhydride with averaged $M_w$ of ~9,100, $M_n$ of ~3,900 by GPC, viscosity of 400 cP at 190° C., acid number of 47 mg KOH/g, softening point of 157° C. (ring and ball) and density of 0.934 g/mL. | Sigma-Aldrich, Product number: 42784-5 |
| MAPP 40 | Maleated polypropylene with acid value of 45~50, viscosity at 190° C. of 400-425 cP, and softening point of 143~155° C. | Chusei, Pasadena Texas |
| Paraflint H-1 | Fisher-Tropsch wax, 10 mPa @ 250° F. | Moore and Munger |
| C80 wax | Fischer Tropsch fractionated polypropylene wax | Moore and Munger |
| Antioxidants and other additives | | |
| Irganox 1010 | Phenolic antioxidant | Ciba-Geigy |
| Test surfaces (substrates) | | |
| Paperboard 84B | generic poster board clay coated newsprint | Huckster Packaging and Supply, Houston, TX |
| Paperboard 84C | generic corrugated cardboard 200# stock | Huckster Packaging and Supply, Houston, TX |
| Inland paper board | High Performance box board | Inland Paper Board and Packaging Company of Rome |
| Black white fabric | Printed stretch 100% Cotton with a Thread Count of 17 by 13 per square cm, a more loosely woven fabric | High Fashion Fabrics, Houston Texas |
| Formica | tabs were made from standard sheet Formica | Lowe's Hardware, Houston Texas |
| Blue fabric | tabs were made from Blue Stock 038C0TP 100% Cotton, Thread Count 21by 45 per square cm with a weight of 0.022 grams per square cm, a tightly woven cotton fabric | High Fashion Fabrics, Houston Texas. |
| Seton catalog paper | book paper bound by a hot melt process as determined from examination | Seton Catalog |
| PET | Polyester (PET), Commonly called Mylar | Several Sources |
| Kraft paper | Kraft paper | Georgia Pacific, Atlanta, Georgia |
| File folder | File folder is a typical manila letter size (⅓ cut) stock having a minimum of 10% post consumer recycle paper content | Smead Paper, stock number 153L, UPC number 10330 |
| PP cast film | An oriented polypropylene cast film made from ESCORENE PP 4772. | ExxonMobil Chemical Company |

Polymers used for adhesive evaluation in the following examples were produced according to the following procedure. Polymerization was performed in a liquid filled, single-stage continuous reactor using mixed metallocene catalyst systems. The reactor was a 0.5-liter stainless steel autoclave reactor and was equipped with a stirrer, a water-cooling/steam-heating element with a temperature controller, and a pressure controller. Solvents, monomers such as ethylene and propylene, and comonomers (such as butene and hexene), if present, were first purified by passing through a three-column purification system. The purification system consisted of an Oxiclear column (Model #RGP-R1-500 from Labelear) followed by a 5A and a 3A molecular sieve columns. Purification columns were regenerated periodically whenever there is evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture.

The solvent, monomers and comonomers were fed into a manifold first. Ethylene from in-house supply was delivered as a gas solubilized in the chilled solvent/monomer mixture in the manifold. The mixture of solvent and monomers were then chilled to about −15° C. by passing through a chiller before fed into the reactor through a single tube. All liquid flow rates were measured using Brooksfield mass flow meters or Micro-Motion Coriolis-type flow meters. Ethylene flow rate was metered through a Brookfield mass flow controller The catalyst compounds used to produce semi-crystalline polypropylene were rac-dimethylsilylbis(2-methyl-4-phenylindenyl)zirconium dimethyl (obtained from Albemarle) and rac-1,2-ethylene-bis(4,7-dimethylindenyl)hafnium dimethyl (obtained from Boulder Scientific Company).

The catalyst compounds used to produce amorphous polypropylene were, dimethylsilyl(tetramethylcyclopentadienyl)(cyclododecylamido)titanium dimethyl (Obtained from Albemarle) and [di(p-triethylsilylphenyl)methylene](cyclopentadienyl) (3,8-di-t-butylfluorenyl)hafnium dimethyl (Obtained from Albemarle).

The catalysts were preactivated with N,N-dimethylanilinium tetrakis(pentafluorophenyl)borate (obtained from Albemarle) at a molar ratio of 1:1 to 1:1.1 in 700 ml of toluene at least 10 minutes prior to the polymerization reaction. The catalyst systems were diluted to a concentration of catalyst ranging from 0.2 to 1.4 mg/ml in toluene. All catalyst solutions were kept in an inert atmosphere with <1.5 ppm water content and fed into reactor by metering pumps. The catalyst solution was used for all polymerization runs carried out in the same day. New batch of catalyst solution was prepared in case that more than 700 ml of catalyst solution was consumed in one day.

In cases of polymerization involving multiple catalyst, each catalyst solution was pumped through separate lines, and then mixed in a manifold, and fed into the reactor through a single line. The connecting tube between the catalyst manifold and reactor inlet was about 1 meter long. The contact of catalyst, solvent and monomers took place in the reactor. Catalyst pumps were calibrated periodically using toluene as the calibrating medium. Catalyst concentration in the feed was controlled through changing the catalyst concentration in catalyst solution and/or changing in the feed rate of catalyst solution. The feed rate of catalyst solution varied in a range of 0.2 to 5 ml/minute.

As an impurity scavenger, 55 ml of tri-iso-butyl aluminum (25 wt. % in toluene, Akzo Noble) was diluted in 22.83 kilogram of hexane. The diluted tri-iso-butyl aluminum solution was stored in a 37.9-liter cylinder under nitrogen blanket. The solution was used for all polymerization runs until about 90% of consumption, and then a new batch was prepared. Feed rates of the tri-iso-butyl aluminum solution varied from polymerization reaction to reaction, ranging from 0 (no scavenger) to 4 ml per minutes.

For polymerization reactions involving alpha, omega-dienes, 1,9-decadiene was diluted to a concentration ranging from 4.8 to 9.5 vol. % in toluene. The diluted solution was then fed into reactor by a metering pump through a comonomer line. The 1,9-decadiene was obtained from Aldrich and was purified by first passing through alumina activated at high temperature under nitrogen, followed by molecular sieve activated at high temperature under nitrogen.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and system reached steady state, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of 2.41 MPa-gauge and in the temperature range of 110 to 130° C.

The detailed experimental conditions and analytical results for polymer samples PP1 through PP9 are presented in Tables 1.

TABLE 1

Detailed polymerization reaction conditions

| | Polymer | | | | | | | | |
|---|---|---|---|---|---|---|---|---|---|
| | PP1 | PP2 | PP3 | PP4 | PP5 | PP6 | PP7 | PP8 | PP9 |
| Catalyst #1 | A | A | A | B | B | B | B | B | B |
| Catalyst #1 feed rate (mole/min) | 2.09E−06 | 5.22E−06 | 6.53E−06 | 1.32E−06 | 1.32E−06 | 2.35E−06 | 1.77E−06 | 1.32E−06 | 8.83E−07 |

TABLE 1-continued

Detailed polymerization reaction conditions

| | Polymer | | | | | | | | |
|---|---|---|---|---|---|---|---|---|---|
| | PP1 | PP2 | PP3 | PP4 | PP5 | PP6 | PP7 | PP8 | PP9 |
| Catalyst #2 | C | D | D | D | D | D | D | D | D |
| Catalyst #2 feed rate (mole/min) | 4.25E−07 | 7.65E−07 | 4.74E−07 | 1.42E−07 | 1.42E−07 | 1.44E−07 | 1.44E−07 | 1.44E−07 | 1.44E−07 |
| Propylene feed rate (g/min) | 14 | 14 | 14 | 14 | 14 | 14 | 14 | 14 | 14 |
| 1,9 decadiene feed rate (ml/min) | — | 2.24 | 0.19 | — | — | — | — | — | — |
| Hexane feed rate (ml/min) | 90 | 90 | 90 | 90 | 90 | 90 | 90 | 90 | 90 |
| Polymerization temperature (° C.) | 110 | 117 | 115 | 130 | 125 | 127 | 126 | 124 | 122 |
| Mn (kg/mol) | 12.2 | — | 17.3 | 11.3 | 13 | — | — | — | — |
| Mw (kg/mol) | 30.6 | — | 34.5 | 25.2 | 31.3 | — | — | — | — |
| Mz (kg/mol) | 84.3 | — | 97.1 | 47.9 | 59.8 | — | — | — | — |
| g' @ Mz | — | — | 0.75 | 0.92 | 0.88 | — | — | — | — |
| Tc (° C.) | 72.3 | 87.0 | 88.5 | 94.1 | 94.5 | 75.7 | 84.5 | 89.8 | 93.4 |
| Tm (° C.) | 112.1 | 133.7 | 136.3 | 131.8 | 131.5 | 117.6 | 123.3 | 127.2 | 130.8 |
| Tg (° C.) | −22.4 | −10.7 | −12.4 | −6.4 | −9.3 | −7.9 | −7.6 | −6.4 | −6.9 |
| Heat of fusion (J/g) | 23.3 | 39.5 | 35.8 | 48.4 | 47.3 | 24.2 | 34.1 | 41.9 | 51.9 |
| Viscosity @190° C. (cp) | 1420 | 518 | 1040 | 877 | 1310 | 1010 | 920 | 1140 | 1077 |

Catalysts:
A: dimethylsilyl(tetramethylcyclopentadienyl)(cyclododecylamido)titanium dimethyl
B: di(p-triethylsilylphenyl)methylene](cyclopentadienyl)(3,8-di-t-butylfluorenyl)hafnium dimethyl
C: rac-1,2-ethylene-bis(4,7-dimethylindenyl)hafnium dimethyl
D: rac-dimethylsilyl bis(2-methyl-4-phenylindenyl) zirconium dimethyl The detailed experimental conditions and analytical results for polymer samples SP1, SP3 through SP6 are presented below. The catalyst used was diphenylmethylene(cyclopentaidenyl)(fluorenyl)hafnium dimethyl and the activator was N,N-dimethylaniliniumtertakis(pentafluorophenyl)borate.

Detailed reaction condition and analytical data

| | Polymer | | | | |
|---|---|---|---|---|---|
| | SP5 | SP4 | SP3 | SP6 | SP1 |
| Polymerization temperature (° C.) | 94 | 107 | 120 | 90 | 110 |
| Catalyst feed rate (mol/min) | 1.75E−06 | 1.75E−06 | 1.75E−06 | 8.76E−07 | 1.75E−06 |
| Propylene (g/min) | 14 | 14 | 14 | 14 | 14 |
| Hexane feed rate (ml/min) | 90 | 90 | 90 | 90 | 90 |
| Mn (kg/mol) | 97.114 | 42.291 | 22.663 | 171.496 | 23 |
| Mw (kg/mol) | 177.094 | 87.196 | 45.041 | 279.851 | 62 |
| Mz (kg/mol) | 287.865 | 146.844 | 79.39 | 423.637 | 148 |
| Triad mole fraction from C13 NMR | | | | | |
| mm | 0.1135 | 0.1333 | 0.1522 | 0.0922 | |
| mr + rm | 0.4352 | 0.4639 | 0.4831 | 0.3992 | |
| rr | 0.4513 | 0.4028 | 0.3646 | 0.5085 | |
| Diad mole fraction from C13 NMR | | | | | |
| m | 0.3311 | 0.3653 | 0.3938 | 0.2918 | |
| r | 0.6689 | 0.6347 | 0.6062 | 0.7082 | |

Polymer samples PP10, PP11 and PP12 were produced in two continuous stirred tank reactors in series. The reactors were operated liquid full under a pressure of 3.65 MPa. The temperatures of both reactors were controlled through hot oil circulation in the reactor jacket. The residence time of the feed in each reactor was 45 minutes. Conversion of propylene to polymer product was about 91%. Propylene feed at the rate of 3.63 kg/hour was combined with hexane at 7.71 kg/hour to form 11.34 kg/hour of reactor feed solution. Tri-n-octyl aluminum (TNOA) as a 3 wt. % solution in hexane (obtained from Albemarle) was introduced into this stream at the rate of 0.272 gram/hour (active basis). Catalyst and activator entered the reactor from a separate port. The catalyst solution consisted of a mixture of di(p-triethylsilylphenyl)methylene](cyclopentadienyl)(3,8-di-t-butylfluorenyl)hafnium dimethyl (catalyst B) and rac-dimethylsilyl bis(2-methyl-4-phenylindenyl) zirconium dimethyl (catalyst D). The catalyst solution was prepared by dissolving the catalyst mixture in toluene to form a 0.5 wt-% solution. The activator feed stream was made up of a 0.2 wt-% solution of N,N-dimethylanilinium tetrakis (pentafluorophenyl)borate in toluene. Both the catalysts and activator were obtained from Albemarle. The catalyst and activator feed lines were configured to mix in line immediately upstream of the first reactor, with an estimated contact time of 2~4 minutes. The catalyst and activator feed rates were 0.04 gram/hour and 0.1 gram/hour (active basis) respectively. Molten polymer was recovered from solution via two flash stages, each with a preheater. The first stage (20 psig) polymer contained about 2% solvent and the second stage (50 torr vacuum) incorporated about 800 ppm volatile. Water was injected into the second stage flash (devolatilizer) feed to quench residual catalyst and aid with solvent stripping. The properties of the polymer and the reaction conditions are summarized in the table below.

| Detailed polymerization condition for samples PP10 to PP12 | | | |
|---|---|---|---|
| | Polymer | | |
| | PP10 | PP11 | PP12 |
| Catalyst B in catalyst mixture (mol. %) | 93 | 86 | 86 |
| Polymerization temperature in leading reactor (° C.) | 134 | 130 | 131 |
| Polymerization temperature in trailing reactor (° C.) | — | 131 | 131 |
| Scavenger concentration in feed (wppm) | 24 | 24.5 | 24.5 |
| Catalyst concentration in feed (wppm) | 4.1 | 4.1 | 4.1 |
| Activator concentration in feed (wppm) | 73.5 | 73.5 | 73.5 |
| Propylene concentration in feed (wt. %) | 28 | 28.6 | 28.6 |
| Conversion (%) | 91 | — | |
| quench water (gram/hour) | — | 2.72 | 2.72 |
| Viscosity @ 190° C. (cP) | 1105 | 1600 | 1522 |
| Shore A hardness | 80 | | |
| Mw (kg/mol) | 32.5 | 41.1 | 40.6 |
| Mn (kg/mol) | 13.2 | 19.6 | 20.7 |
| Mz (kg/mol) | 62.8 | 76 | 72.5 |
| g' @ Mz | 0.85 | 0.82 | |
| Tc (° C.) | 74.8 | 77.8 | 68.6 |
| Tm (° C.) | 133 | 132 | 132 |
| Heat of fusion (J/g) | 30.6 | 28.7 | 29.5 |

The following polymers were maleated and used as a modifier for adhesion enhancement. The functionalization was carried out by dissolving 120 g of polymer in toluene (polymer concentration is about 20 wt. %) and then combining with 15 wt. % (based on polymer) of maleic anhydride ("MA") and 2.5 wet % of 2,5-dimethyl-2,5-di(t-butylperoxyl)hexene. The reaction temperature was maintained at 139° C. for 4 hours. The method described by M. Sclavons et al. (Polymer, 41 (2000), page 1989) was used to determine the MA content of the maleated polymers. Briefly, about 0.5 gram of polymer was dissolved in 150 ml of toluene at the boiling temperature. A potentiometric titration with tetra-butylammonium hydroxide using bromothymol blue as the color indicator was performed on the heated solution in which the polymer did not precipitate during the titration. The molecular weight and MA content of the maleated polymers are listed below.

| | Modifier # | | | |
|---|---|---|---|---|
| | SP6-g-MA | SP4-g-MA | SP3-g-MA | PP12-g-MA |
| | | Polymer | | |
| | SP6 | SP4 | SP3 | PP12 |
| Mn (kg/mol) | 60 | 23 | 17 | 12 |
| Mw (kg/mol) | 135 | 44 | 33 | 36.5 |
| Mz (kg/mol) | 263 | 71 | 55 | 64.7 |
| MA. (wt. %) | 1.12 | 1 | 1.92 | 1.41 |

The following polymers were maleated and used as a modifier for adhesion enhancement. The maleation was carried out by following the procedure described in WO 02/36651.

TABLE 5

| | Modifier # | | |
|---|---|---|---|
| | VM-3000-g-MA | VM-2000-g-MA | EP3-g-MA |
| | | Polymer | |
| | VM-3000 | VM-2000 | EP-3 |
| Mn (kg/mol) | 17 | 16 | 36 |
| Mw (kg/mol) | 74 | 66 | 63 |
| Mz (kg/mol) | 116 | 103 | 89 |
| MA (wt. %) | 1.92 | 1.98 | |
| Ethylene content (wt. %) | 10.7 | 14.4 | 10 |

A number of hot melt adhesives were prepared by using the polymers or blending the polymer, functionalized additives, tackifier, wax, antioxidant, and other ingredients under low shear mixing at elevated temperatures to form fluid melt. The mixing temperature varies from about 130 to about 190° C. As examples, The tables below list the detailed formulation and the properties of blends. All the adhesion tests were conducted at ambient condition unless otherwise noted. The formulations are in weight percent.

| Adhesion tests on various substrates | | | | | | |
|---|---|---|---|---|---|---|
| | Formulation | | | | | |
| | HM1 | HM2 | HM3 | HM4 | HM5 | HM6 |
| Polymer/adhesive | REXTAC 2715 | REXTAC 2715 | PP10 | PP10 | PP10 | Tite Bond Wood Glue |
| Polymer (wt. %) | 100 | 91 | 100 | 91 | 91 | 100 |
| Paraflint H-1 (wt. %) | 0 | 0 | 0 | 0 | 3 | 0 |
| Escorez 5637 (wt. %) | 0 | 3 | 0 | 3 | 3 | 0 |
| MAPP 40 (wt. %) | 0 | 0 | 0 | 0 | 3 | 0 |
| AC 1302P (wt. %) | 0 | 6 | 0 | 6 | 0 | 0 |
| Shore "A" hardness | 26 | 22 | 53 | 56 | 53 | — |
| Set time (sec) | 6+ | 6+ | 6+ | 2.5 | 3 | — |
| Viscosity @ 190° C. (cps) | 1730 | 1422 | 1340 | 1090 | 1020 | — |

-continued

Adhesion tests on various substrates

| | Formulation | | | | | |
|---|---|---|---|---|---|---|
| | HM1 | HM2 | HM3 | HM4 | HM5 | HM6 |
| Adhesion (Dot T-peel) and failure types | | | | | | |
| Mylar (PET) aged 4 days | cf, 3.896 | cf, 5.366 | ss, af, 1.087 | ss, af, 1.488 | ss, cf, 4.629 | af, cf, 0.1517 |
| Seton catalog paper aged 4 days | sf, 1.113 | sf, 1.337 | sf, 1.091 | sf, 1.131 | sf, 0.8797 | sf, 0.944 |
| Blue fabric to Formica aged 4 days | cf, 5.457 | cf, 5.608 | cf, 5.401 | cf, 5.974 | cf, 8.232 | cf, 20.79 |
| Black white fabric to Formica aged 4 days | cf, 3.001 | cf, 4.210 | cf, 3.681 | cf, 4.066 | cf, 5.874 | ss, cf, 18.92 |
| PP cast film laminate aged 4 days | 4.643 cf | cf, 6.56 | cf, af, ab, 7.233 | cf, af, 3.587 | cf, af, 3.140 | would not dry |
| Kraft paper aged 4 days | cf, ab, af, 1.79 | cf, ab, af, 1.885 | 2.064 | 1.763 | 1.84 | 2.713 |
| Averaged fiber tear on Inland paper board (overnight) | | | | | | |
| @ 5° C. (%) | 94 | 88 | 5 | 3 | 89 | — |
| @ −12° C. (%) | 46 | 60 | 62 | 13 | 99 | — | cf—cohesive failure;
af—adhesive failure;
ab—adhesive break
sf—substrate failure;
ss—slip stick,
6+ - longer than 6 seconds REXTAC RT 2715 is a copolymer of propylene, butene and ethylene having about 67.5 mole percent propylene, about 30.5 mole percent butene and about 2 mole percent ethylene produced by Huntsman, Company. The copolymer has about 11 mole percent BB dyads, 40 mole percent PB dyads and about 49 mole percent PP dyads. The melting point is 76° C. with a melting range form 23 to 124° C. the Tg is −22° C., the crystallinity is about 7 percent, the enthalpy is 11 J/g by DSC. The Mn is 6630 the Mw is 51200 and the Mz 166,700 by GPC. Mw/Mn is 7.7.

Adhesion tests on substrate fiber tear (Dot T-peel)

| | Formulation | | | | | | | |
|---|---|---|---|---|---|---|---|---|
| | HM7 | HM8 | HM9 | HM10 | HM11 | HM12 | HM13 | HM14 |
| Polymer | PP6 | PP6 | PP7 | PP7 | PP8 | PP8 | PP9 | PP9 |
| Polymer (wt. %) | 99 | 90.1 | 99 | 90.1 | 99 | 90.1 | 99 | 90.1 |
| Escorez 5637 (wt. %) | 0 | 3 | 0 | 3 | 0 | 3 | 0 | 3 |
| Irganox 1010 (wt. %) | 1 | 1 | 1 | 1 | 1 | 1 | 1 | 1 |
| AC 1302P (wt. %) | 0 | 6 | 0 | 6 | 0 | 6 | 0 | 6 |
| Shore A hardness | 65 | 61 | 82 | 83 | 93 | 88 | 92 | 95 |
| Set time (sec) | 3 | 2.5 | 6 | 1.5 | 4 | 1.5 | 3.5 | 1.5 |
| Viscosity @ 190° C. (cps) | 1193 | 1066 | 1027 | 927.5 | 1320 | 1130 | 1192 | 1027 |
| SAFT (° F.) | 229 | 229 | 250 | 249 | 264 | 263 | >270 | 254 |
| Paperboard 84C overnight (%) | 100 | 100 | 95 | 88 | 20 | 86 | 3 | 0 |
| File folder overnight (%) | 100 | 100 | 100 | 100 | 100 | 100 | 100 | 100 |
| Paperboard 84C overnight (%): 5° C./−12° C. | 98/99 | 98/98 | 91/96 | 30/99 | 97/96 | 93/98 | 69/89 | 77/95 |
| File folder overnight (%): 5° C./−12° C. | 100/98 | 100/90 | 100/100 | 100/100 | 98/99 | 98/96 | 90/89 | 95/82 |

Adhesion tests on substrate fiber tear and failure types (Dot T-peel)

| | Formulation | | | | | | | |
|---|---|---|---|---|---|---|---|---|
| | HM15 | HM16 | HM17 | HM18 | HM19 | HM20 | HM21 | HM22 |
| PP11 (wt. %) | 77.5 | 77.5 | 77.5 | 77.5 | 77.5 | 79.6 | 81.6 | |
| C80 wax | 8.2 | 8.2 | 8.2 | 8.2 | 8.2 | 8.5 | 8.7 | |
| Escorez 5690 | 8.6 | 8.6 | 8.6 | 8.6 | 8.6 | 8.8 | 9.0 | |
| Irganox 1010 | 0.7 | 0.7 | 0.7 | 0.7 | 0.7 | 0.7 | 0.7 | |
| AC 596P (wt. %) | 5 | | | | | | | |
| AC 597 (wt. %) | | 5 | | | | 2.5 | | |
| AC X1325 (wt. %) | | | 5 | | | | | |
| MAPP 40 (wt. %) | | | | 5 | | | | |
| AC 1302P (wt. %) | | | | | 5 | | | |
| Advantra 9250 (wt. %) | | | | | | | | 100 |
| Set time (sec) | 2 | 2.5 | 3 | 2.5 | 2.5 | 2.5 | 3~3.5 | 1.5 |
| Shore A hardness | 73 | 71 | 76 | 71 | 68 | 68 | 64 | 89 |
| Substrate fiber tear at low temperatures (%) | | | | | | | | |
| Paperboard 84C @ −10° C. | 100 | 98 | 100 | 91 | 79 | 98 | 99 | 98 |
| Paperboard 84C @ −30° C. | 96 | 96 | 98 | 100 | 100 | 100 | 99 | 98 |
| Inland Paper Board @ −10° C. | 93 | 96 | 90 | 89 | 0, ab, af | 8 | 0, ab, af | 90 |
| Inland Paper Board @ −30° C. | 10 | 91 | 37 | 90 | 40 | 24 | 0, ab, af | 80 |
| Substrate fiber tear at ambient condition | | | | | | | | |
| Inland paper board | 100 | 99 | 100 | 100 | 99 | 100 | 99 | 98 |
| Paperboard 84C | 100 | 100 | 100 | 100 | 100 | 99 | 100 | 100 | ab—adhesive break,
af—adhesive failure

Adhesion tests of substrate fiber tear (Dot-T peel)

| | Formulation | | | | | |
|---|---|---|---|---|---|---|
| | HM23 | HM24 | HM25 | HM26 | HM27 | HM28 |
| PP3 (wt. %) | 100 | 82.2 | 81.3 | 77.2 | 73.6 | 70.3 |
| PP1 (wt. %) | 0 | 0 | 0 | 0 | 4.7 | 9 |
| Paraflint H-1 (wt. %) | 0 | 9.9 | 5.2 | 5 | 4.7 | 4.5 |
| Escorez 5637 (wt. %) | 0 | 6.9 | 7.3 | 6.9 | 6.6 | 6.3 |
| Irganox 1010 (wt. %) | 0 | 1 | 1 | 1 | 1 | 0.9 |
| PP-grafted maleic anhydride (wt. %) Sigma-Aldrich | 0 | 0 | 5.2 | 5 | 4.7 | 4.5 |
| Kaydol oil (wt. %) | 0 | 0 | 0 | 5 | 4.7 | 4.5 |
| Shore A hardness | 75 | 80 | 80 | 67 | 64 | 73 |
| Set time (sec) | 6+ | 1 | 1.5 to 2 | 2 | 2.5 | 2.5 |
| Viscosity @ 190° C. (cps) | 1040 | 763 | 772.5 | 681 | 640 | 761.7 |
| SAFT (° F.) | — | 233 | — | — | — | — |
| Paperboard 84C overnight (%) | 67 | 0 | 100 | 100 | 100 | 100 |
| File folder overnight (%) | 100 | 0 | 100 | 100 | 100 | 100 |
| Paperboard 84C overnight (%): 5° C./−12° C. | 50/ | 0/0 | 90/95 | 98/98 | 98/99 | 100/100 |
| File folder overnight (%): 5° C./−12° C. | 100/ | 0/0 | 100/100 | 100/100 | 100/100 | 100/100 |

Adhesion tests on substrate fiber tear (Dot-T peel)

| | Formulation | | | | | | | | | |
|---|---|---|---|---|---|---|---|---|---|---|
| | HM29 | HM30 | HM31 | HM32 | HM33 | HM34 | HM35 | HM36 | HM37 | HM38 |
| PP2 | 71.6 | 67.2 | 74.8 | 70.3 | 82.2 | 77.2 | 78.3 | 73.6 | 74.8 | 70.3 |
| PP1 | 8.6 | 8.6 | 4.5 | 4.5 | 5.0 | 5 | 9.4 | 9.4 | 9 | 9 |

Adhesion tests on substrate fiber tear (Dot-T peel)

| | Formulation | | | | | | | | | |
|---|---|---|---|---|---|---|---|---|---|---|
| | HM29 | HM30 | HM31 | HM32 | HM33 | HM34 | HM35 | HM36 | HM37 | HM38 |
| Paraflint H-1 (wt. %) | 4.3 | 4.3 | 4.5 | 4.5 | 5.0 | 5 | 4.7 | 4.7 | 4.5 | 4.5 |
| Escorez 5637 (wt. %) | 6.0 | 6.0 | 6.3 | 6.3 | 6.9 | 6.9 | 6.6 | 6.6 | 6.3 | 6.3 |
| Irganox 1010 (wt. %) | 0.9 | 0.9 | 0.9 | 0.9 | 1.0 | 1 | 0.9 | 0.9 | 0.9 | 0.9 |
| MAPP 40 (wt. %) | 0.0 | 4.3 | 0.0 | 4.5 | 0.0 | 5 | 0 | 4.7 | 0 | 4.5 |
| Kaydol oil (wt. %) | 8.6 | 8.6 | 9.0 | 9.0 | 0.0 | 0 | 0 | 0 | 4.5 | 4.5 |
| Shore A hardness | 65 | 65 | 67 | 77 | 84 | 84 | 80 | 83 | 72 | 77 |
| Set time (sec) | 3 | 2.5 | 3 | 1.5 | 2 | 1.5 | 2.5 | 2 | 3 | 1.5 |
| Viscosity @ 190° C. (cps) | 344 | 332 | 332.5 | 401.6 | 460.2 | 477.5 | 488 | 528 | 380 | 487.5 |
| SAFT (F) | — | 263 | — | 263 | — | 270 | — | 270 | — | 268 |
| Substrate fiber tear (%) | | | | | | | | | | |
| Paperboard 84C overnight (%) | 3.4 | 100 | 0 | 100 | 0 | 100 | 30 | 100 | 0 | 100 |
| File folder overnight (%) | 70 | 100 | 65 | 100 | 90 | 100 | 60 | 100 | 60 | 100 |
| Paperboard 84B overnight (%) | 100 | 100 | 100 | 100 | 100 | 100 | 100 | 100 | 100 | 100 |
| Paperboard 84C overnight at 5° C. (%) | 0 | 100 | 0 | 100 | 0 | 100 | 0 | 100 | 0 | 100 |
| File folder overnight @ 5° C. (%) | 0 | 100 | 20 | 100 | 100 | 100 | 30 | 100 | 100 | 100 |
| Paperboard 84B overnight at 5° C. (%) | 100 | 100 | 67 | 100 | 100 | 100 | 100 | 100 | 100 | 100 |

Adhesion tests of substrate fiber tear (Dot-T peel)

| Formulation | HM39 | HM40 | HM41 | HM42 |
|---|---|---|---|---|
| PP4 | 82.2 | 99 | 0 | 0 |
| PP5 | 0 | 0 | 82.2 | 99 |
| Paraflint H-1 (wt. %) | 5 | 0 | 5 | 0 |
| Escorez 5637 (wt. %) | 6.9 | 0 | 7 | 0 |
| Irganox 1010 (wt. %) | 1 | 1 | 1 | 1 |
| MAPP 40 (wt. %) | 5 | 0 | 5 | 0 |
| Shore A hardness | 85 | 82 | 88 | 88 |
| Set time (sec) | 2 | 6+ | 2 | 6+ |
| Viscosity @ 190° C. (cps) | 737.1 | 1070 | 937.5 | 1275 |
| Paperboard 84C overnight (%) | 100 | 0 | 100 | 0 |
| File folder overnight (%) | 0 | 100 | 100 | 100 |
| Paperboard 84C overnight (%): 5° C./−12° C. | 83/100 | 63/95 | 98/95 | 80/100 |
| File folder overnight (%): 5° C./−12° C. | 65/95 | 70/50 | 90/90 | 80/100 |

Adhesion tests of substrate fiber tear (Dot T-peel)

| | Formulation | | | | | | | |
|---|---|---|---|---|---|---|---|---|
| | HM43 | HM44 | HM45 | HM46 | HM47 | HM48 | HM49 | HM50 |
| PP3 | 100 | 86.5 | 81.3 | 82.2 | 77.2 | 78.3 | 73.6 | 0 |
| Paraflint H-1 (wt. %) | 0 | 5.2 | 5.2 | 5 | 5 | 4.7 | 4.7 | 0 |
| Escorez 5637 (wt. %) | 0 | 7.3 | 7.3 | 6.9 | 6.9 | 6.6 | 6.6 | 0 |
| Irganox 1010 (wt. %) | 0 | 1 | 1 | 1 | 1 | 0.9 | 0.9 | 0 |
| MAPP 40 (wt. %) | 0 | 0 | 5.2 | 0 | 5 | 0 | 4.7 | 0 |
| Kaydol oil (wt. %) | 0 | 0 | 0 | 4.95 | 5 | 9.4 | 9.4 | 0 |
| Henkel hot melt 80-8368 (wt. %) | | | | | | | | 100 |
| Shore A hardness | 75 | 72 | 72 | 66 | 76 | 64 | 64 | 82 |
| Set time (sec) | 6+ | 2 | 1.5 | 2 | 1.5 | 2.5 | 1.5 | 1 |

-continued

Adhesion tests of substrate fiber tear (Dot T-peel)

| | Formulation | | | | | | | |
|---|---|---|---|---|---|---|---|---|
| | HM43 | HM44 | HM45 | HM46 | HM47 | HM48 | HM49 | HM50 |
| Viscosity @ 190° C. (cps) | 1040 | — | 765 | — | 731 | — | 508 | 717.5 |
| SAFT (° F.) | — | — | 268 | — | 268 | — | 263 | 177 |
| Paperboard 84C overnight (%) | 67 | 100 | 100 | 34 | 100 | 34 | 100 | 100 |
| File folder overnight (%) | 100 | 100 | 100 | 100 | 100 | 100 | 100 | 100 |
| Paperboard 84B overnight (%) | 100 | 100 | 100 | 100 | 100 | 100 | 100 | 100 |
| Paperboard 84C overnight (%): 5° C./−12° C. | 50/ | 60/ | 94/100 | 34/ | 97/97 | 24/ | 100/67 | 100/100 |
| File folder overnight (%): 5° C./−12° C. | 100/ | 100/ | 100/25 | 100/ | 0/70 | 100/ | 100/88 | 100/100 |

Adhesion tests of substrate fiber tear (Dot T-peel)

| | Formulation | | | | |
|---|---|---|---|---|---|
| | HM51 | HM52 | HM53 | HM54 | HM55 |
| Polymer PP12 (wt. %) | 80 | 75 | 75 | 75 | 75 |
| Escorez 5690 (wt. %) | 10 | 10 | 10 | 10 | 10 |
| C80 Wax (wt. %) | 10 | 10 | 10 | 10 | 10 |
| Irganox 1010 (wt. %) | 0.7 | 0.7 | 0.7 | 0.7 | 0.7 |
| Modifier | — | SP6-g-MA | SP4-g-MA | SP3-g-MA | PP12-g-MA |
| Modifier (wt. %) | — | 5 | 5 | 5 | 5 |
| Viscosity at 170° C. (cps) | 1650 | 3090 | 2350 | 1990 | |
| Set time (sec) | 3 | 3.5 | 3.5 | 3 | 3.5 |
| Shore A hardness | 83/63 | 86/67 | 81/68 | 85/66 | 81/71 |
| Percent of fiber tear on Inland paperboard | | | | | |
| @ 25° C. | 96 | 100 | 99 | 98 | 94 |
| @ −8° C. | 0 | 58 | 43 | 18 | 43 |
| @ −30° C. | 13 | 75 | 48 | 1 | 68 |

Adhesion tests of substrate fiber tear (Dot T-peel)

| | Formulation | | | | | | | |
|---|---|---|---|---|---|---|---|---|
| | HM56 | HM57 | HM58 | HM59 | HM60 | HM61 | HM62 | HM63 |
| Polymer PP12 (wt. %) | 80 | 75 | 75 | 75 | 77 | 75 | 75 | 75 |
| Escorez 5690 (wt. %) | 10 | 10 | 10 | 10 | 10 | 10 | 10 | 10 |
| C80 Wax (wt. %) | 10 | 10 | 10 | 10 | 10 | 10 | 10 | 10 |
| Irganox 1010 (wt. %) | 0.7 | 0.7 | 0.7 | 0.7 | 0.7 | 0.7 | 0.7 | 0.7 |
| Modifier | — | VM-1000 | VM-3000 | VM-2000 | VM-2000 | VM-3000-g-MA | VM-2000-g-MA | EP-3-g-MA |
| Modifier (wt. %) | — | 5 | 5 | 5 | 3 | 5 | 5 | 5 |
| Viscosity at 170° C. (cps) | 1650 | 2020 | 2590 | 2700 | 1800 | 2120 | 2250 | 2040 |
| Set time (sec) | 3 | 4 | 3 | 4 | 4 | 3.5 | 2.5 | 4 |
| Shore A hardness | 83/63 | 87/68 | 93/71 | 75/58 | 76/60 | 88/71 | 88/65 | 78/61 |
| Percent of fiber tear on Inland paperboard at various temperatures | | | | | | | | |
| @ 25° C. | 96 | 99 | 95 | 98 | 99 | 99 | 99 | 99 |
| @ −8° C. | 0 | 0 | 55 | 38 | 0 | 3 | 65 | 28 |
| @ −30° C. | 13 | 3 | 4 | 30 | 0 | 8 | 80 | 30 |

In the following examples, the olefin polymer of the present invention are, labeled either as aPP-iPP's or POA's, and are propylene homopolymers prepared with two metallocene catalysts as described above. As an example of the mixed catalyst systems for preparing this type of polymer, one catalyst, di(p-triethylsilylphenyl)methylene(cyclopentadienyl)(3,8-di-t-butylfluorenyl)hafnium dimethyl, produces atactic polypropylene, aPP whereas the second catalyst, rac-dimethylsilyl bis(2-methyl-4-phenylindenyl)zirconium dimethyl, produces isotactic polypropylene, iPP.

In the examples, polymerization temperature was changed to vary the molecular weight of the polymer. Under some polymerization conditions, crosslinking of aPP and iPP polymer chains occurs so that a small amount of aPP-g-iPP is present. Several of these propylene-based polymers used in this work are described in the table below, where $\eta$ is the Brookfield viscosity measured according to ASTM D3236. The heat of fusion ($\Delta Hf$) value of each polymer can be considered as a measure of crystallinity. The heat of fusion for crystalline PP is 207 J/g. The heat of fusion value of each aPP-iPP in the table below divided by 207 J/g is the degree of crystallinity. Therefore, aPP-iPP-1, -2 and -3 have similar degrees of crystallinity, whereas aPP-iPP-4, -5 and -6 are less crystalline. The $g_w'$ is the weight-average branching coefficient. A lower $g_w'$ suggests a higher concentration and/or higher level of aPP-g-iPP in the aPP-iPP polymer.

Functionalized srPPs

Syndiotactic rich polymers were produced according to the general procedures described above. The catalysts used was diphenylmethylene(cyclopentadienyl)(fluorenyl)hafnium dimethyl, the activator used was N,N-dimethylaniliniumtetrakis(pentafluorophenyl)borate. The polymerization for srPP-1 was 110° C., and for srPP2 was run at 120° C., both in hexane. The polymers have % [r] dyads ~58-75. Each srPP polymer has very low degree of crystallinity and is almost amorphous.

The functionalized srPP's used in this study are shown the table below where srPP-i represents the precursor polymer of the MA-srPP-i, Amide-srPP-i or Acid-srPP-i. It is interesting to note that, after functionalization, molecular weights were decreased in all cases. To compare the performance of functionalized srPP-1's to their non-functionalized counterparts, the lowest molecular weight srPP-3 polymer was used as a control. Even though srPP-3 has molecular weights ($M_n$, $M_n$ and $M_z$) approximately two times higher than the functionalized srPP-1's, we choose srPP-3 as the control because its molecular weights are closer to the functionalized components.

In an example, functionalization of the polymers was carried out by dissolving 120 g of polymer in toluene (polymer concentration: 20 wt %). Fifteen wt % maleic anhydride based on srPP was used. The radical initiator, 2,5-dimethyl-2,5-di(t-butylperoxyl)hexane, was 2.5 wt % based on srPP. The reaction temperature was 139° C. and the reaction time was 4 hr.

POLYLETS® MAPP 40, available from CHUSEI, are shown below. This commercially available MAPP-40 has a higher MA content but a higher degree of crystallinity than the MA-srPP polymers used in this study.

| Characterization of Propylene-Based Polymers. | | | | | | |
|---|---|---|---|---|---|---|
| | aPP-iPP- | | | | | |
| | 1 | 2 | 3 | 4 | 5 | 6 |
| Catalyst #1 | B | B | B | B | B | B |
| Catalyst #2 | D | D | D | D | D | D |
| $T_c$, °C. | 88 | 90 | 92 | 80 | 78 | 68 |
| $T_m$, °C. | 127 | 138 | 141 | 139 | 132 | 136 |
| $T_g$, °C. | −6 | −5 | −4 | | | −6 |
| $\Delta H_u$, J/g | 37 | 38 | 38 | 32 | 29 | 22 |
| Viscosity at 190° C. $\eta$, cp | 1900 | 4000 | 11000 | 2400 | 1600 | 1500 |
| $M_n$/1000 | 13.0 | 15.2 | 20.4 | | 19.6 | 13.1 |
| $M_w$/1000 | 37.6 | 45.2 | 55.0 | | 41.1 | 29.3 |
| $M_z$/1000 | 64.0 | 81.0 | 94.6 | | 76.0 | 62.6 |
| $g_w'$ | 0.93 | 0.95 | 0.93 | | 0.88 | 0.99 |

| Characterization of srPP's. | | | | | | | |
|---|---|---|---|---|---|---|---|
| Polymer | Rxn Temp., °C. | Catalyst | $M_n/10^3$ | $M_w/10^3$ | $M_z/10^3$ | $g_w'$ | Wt % FG* |
| srPP-1 | 110 | E4 | 23 | 62 | 148 | 1.08 | 0 |
| srPP-3 | 120 | E4 | 17 | 43 | 80 | 0.98 | 0 |
| srPP-4 | 107 | E4 | 34 | 86 | 177 | 1.05 | 0 |
| srPP-5 | 94 | E4 | 74 | 188 | 385 | 1.11 | 0 |
| srPP-6 | 90 | ED4 | 128 | 311 | 606 | 1.19 | 0 |
| srPP-1-g-MA | | | 8 | 20 | 38 | | 3.20 |
| srPP-3-g-MA | | | 17 | 33 | 55 | | 1.92 |
| srPP-4-g-MA | | | 23 | 44 | 71 | | 1.00 |
| srPP-5-g-MA | | | 29 | 68 | 116 | | 1.00 |
| srPP-6-g-MA | | | 60 | 135 | 263 | | 1.12 |
| srPP-1-g-amide | | | ~8 | ~20 | ~38 | | ~1.00 |
| srPP-1-g-acid | | | ~8 | ~20 | ~38 | | ~1.00 |
| MAPP-40 | | | 3.7 | 9.8 | 18 | | 5.24 |

*Functional Group
E4 is a combination of diphenylmethylene(cyclopentadienyl)(fluorenyl)hafnium dimethyl and N,N-dimehtyl aniliniumtetrkis(pentafluorphenyl) borate

| Molecular Weight Change of srPP After Maleation. | | | | | | | | | |
|---|---|---|---|---|---|---|---|---|---|
| Polymer | $T_{rxn}$, °C. | Catalyst | $M_n/10^3$ | $M_w/10^3$ | $M_z/10^3$ | $M_w/M_n$ | $\Delta M_w/M_w$ | $g_w'$ | Wt % MA |
| srPP-3 | 120 | E4 | 17 | 43 | 80 | 2.53 | | 0.98 | 0 |
| srPP-3-g-MA | | | 17 | 33 | 55 | 1.94 | 0.23 | | 1.92 |
| srPP-4 | 107 | E4 | 34 | 86 | 177 | 2.53 | | 1.05 | 0 |
| srPP-4-g-MA | | | 23 | 44 | 71 | 1.91 | 0.49 | | 1.00 |
| srPP-5 | 94 | E4 | 74 | 188 | 385 | 2.54 | | 1.11 | 0 |
| srPP-5-g-MA | | | 29 | 68 | 116 | 2.34 | 0.64 | | 1.00 |

Molecular Weight Change of srPP After Maleation.

| Polymer | $T_{rxn}$, °C. | Catalyst | $M_n/10^3$ | $M_w/10^3$ | $M_z/10^3$ | $M_w/M_n$ | $\Delta M_w/M_w$ | $g'_w$ | Wt % MA |
|---|---|---|---|---|---|---|---|---|---|
| srPP-6 | 90 | E4 | 128 | 311 | 606 | 2.43 | | 1.19 | 0 |
| srPP-6-g-MA | | | 60 | 135 | 263 | 2.25 | 0.57 | | 1.12 |

Adhesion to Mylar for Compositions without Tackifier.

| | T-Peel, lb/in | Failure Mode |
|---|---|---|
| aPP-iPP-1 | 0.03 | AF |
| aPP-iPP-1 + 20 Wt % srPP-3 | 0.10 | AF |
| aPP-iPP-1 + 20 Wt % MAPP-40 | 0.19 | CF |
| aPP-iPP-1 + 20 Wt % srPP-1-g-amide | 0.10 | AF |
| aPP-iPP-1 + 20 Wt % srPP-1-g-MA | 0.48 | AF |
| aPP-iPP-2 | 0.03 ≈ $P_1$ | AF/CF |
| aPP-iPP-2 + 20 Wt % srPP-3 | 0.04 | AF |
| aPP-iPP-2 + 20 Wt % MAPP-40 | 0.20 | CF |
| aPP-iPP-2 + 20 Wt % srPP-1-g-acid | 0.05 | AF |
| aPP-iPP-2 + 20 Wt % srPP-1-g-amide | 0.08 | CF |
| aPP-iPP-2 + 20 Wt % srPP-1-g-MA | 1.21~40$P_1$ | AF |
| aPP-iPP-2 + 20 Wt % srPP-3-g-MA | 1.83 | CF/AF |
| aPP-iPP-2 + 20 Wt % srPP-4-g-MA | 2.12 | AF |
| aPP-iPP-2 + 20 Wt % srPP-5-g-MA | 6.28~200$P_1$ | CF/AF |
| aPP-iPP-2 + 20 Wt % srPP-6-g-MA | 4.58 | AF |
| aPP-iPP-3 | 0.001 | AF |
| aPP-iPP-3 + 20 Wt % srPP-3 | 0.02 | AF |
| aPP-iPP-3 + 20 Wt % MAPP-40 | 0.32 | CF |
| aPP-iPP-3 + 20 Wt % srPP-1-g-amide | 0.09 | AF |
| aPP-iPP-3 + 20 Wt % srPP-1-g-MA | 0.40 | AF |

Adhesion to Mylar for Compositions with Tackifier
(aPP-iPP/E-5380/Polymer Modifier = 72/8/20 Wt. Ratio)

| | T-Peel, lb/in | Failure Mode |
|---|---|---|
| aPP-iPP-2/E-5380 (9 to 1 Wt. Ratio) | 0.04 ≈ $P_2$ | AF |
| aPP-iPP-2/E-5380/srPP-3 | 0.04 | AF |
| aPP-iPP-2/E-5380/MAPP-40 | 0.14 | CF |
| aPP-iPP-2/E-5380/srPP-1-g-acid | 0.06 | AF |
| aPP-iPP-2/E-5380/srPP-1-g-amide | 0.22 | AF |
| aPP-iPP-2/E-5380/srPP-1-g-MA | 2.15~50 $P_2$ | CF/AF |
| aPP-iPP-2/E-5380/srPP-3-g-MA | 2.56 | CF |
| aPP-iPP-2/E-5380/srPP-4 | 0.05 | AF |
| aPP-iPP-2/E-5380/srPP-4-g-MA | 5.83 | CF |
| aPP-iPP-2/E-5380/srPP-5 | 0.13 | AF |
| aPP-iPP-2/E-5380/srPP-5-g-MA | 12.02 | AF/CF |
| aPP-iPP-2/E-5380/srPP-6 | 0.02 | AF |
| aPP-iPP-2/E-5380/srPP-6-g-MA | 13.77~350 $P_2$ | CF |

E-5380 is ESCOREZ 5380 ™ a hydrogenated dicyclopentadien based hydrocarbon resin having a Ring and Ball softening point of about 85° C. available form ExxonMobil Chemical Co. ion Houston Texas.

Bonding to Mylar and iPP of Modified POA's.

| | T-Peel to Mylar, lb/in | Failure Mode | T-Peel to iPP, lb/in | Failure Mode |
|---|---|---|---|---|
| aPP-iPP-2/MAPP-40 | 0.20 | CF | 2.90 | CF |
| aPP-iPP-2/E-5380/MAPP-40 | 0.14 | CF | 2.87 | CF |
| aPP-iPP-2/E-5380 | 0.04 | AF | 3.09 | CF |
| aPP-iPP-2/E-5380/srPP-3 | 0.09 | AF | >10.31 | Substrate Broken |
| aPP-iPP-2/E-5380/SrPP-1-g-MA | 2.15 | CF/AF | >8.53 | Substrate Broken |

Bonding to Mylar and iPP of MAPP-40 and MA-srPP's.

| | T-Peel to Mylar, lb/in | Failure Mode | T-Peel to iPP, lb/in | Failure Mode |
|---|---|---|---|---|
| MAPP-40 | 0.005 | AF | 3.65 | CF |
| MA-srPP-3 | 6.60 | CF | 5.72 | CF |
| SrPP-4-g-MA | 8.13 | CF | 7.80 | CF |
| MA-srPP-5 | 1.66 | AF | 11.17 | CF |
| SrPP-6-g-MA | 2.59 | AF | >5.96 | Substrate Broken |

POA's Modified by Tackifier and Wax.

| | Formulated PP-1 | Formulated PP-2 |
|---|---|---|
| aPP-iPP-4 | 79.4 | — |
| aPP-iPP-5 | — | 81.6 |
| E-2203 ($T_g$ = 47° C.) | 13.4 | — |
| E-5690 ($T_g$ = 45° C.) | — | 9.02 |
| Paraflint C80 | 6.7 | 8.68 |
| Irganox 1010 | 0.50 | 0.69 |
| T-Peel to Mylar, lb/in | 0.23 | 0.45 |
| Failure Mode | AF | CF |

Adhesion to Mylar for Compositions Based on aPP-iPP-6
(aPP-iPP/E-5380/Polymer Modifier = 72/8/20 Wt. Ratio)

| | T-Peel, lb/in | Failure Mode |
|---|---|---|
| aPP-iPP-6 | 0.07 | CF |
| aPP-iPP-6/E-5380 (9 to 1 Wt. Ratio) | 0.19 | CF |
| aPP-iPP-6/E-5380/SrPP-3-g-MA | 4.32 | CF |
| aPP-iPP-6/E-5380/SrPP-4-g-MA | 6.94 | CF |
| aPP-iPP-6/E-5380/SrPP-5-g-MA | 11.1 | CF |
| aPP-iPP-6/E-5380/MA-srPP-6 | 12.0 | CF |

The blends of the olefin polymer with each functionalized component were mixed thoroughly and homogeneously in the thermal cell of a Brookfield viscometer equipped with an electrically driven stirrer at 180° C. After mix, the blends were degassed in a vacuum oven (continuously purged by nitrogen) at 180° C. and subsequently cooled down to 25° C. Each adhesive sample composition was then molded into a thin sheet of material with thickness about 0.4 mm using a molding temperature of 180° C. and a molding time of 10 seconds. For the preparation of the T-peel specimens, this thin sheet of adhesive sample was laminated between two pieces of Mylar substrate (3-mil thickness) in a positive pressure, Teflon-coated mold. The bonding temperature was 180° C. and the bonding time was 10 seconds. The laminate was then cut into ½"=1.3 cm wide specimens. All the T-peel measurements were performed at room temperature and at a separation speed of 2 inches per minute=850 micrometers per second (μm/s).

As the data shows, the functionalized srPP provide a benefit to the T-peel strengths to Mylar of these compositions.

Clearly, functional groups improve adhesion of propylene-based polymer to Mylar with the MA group showing the better results. Also, viscosity (or molecular weight) of the propylene-based polymer will affect adhesion, with the medium molecular weight polymer.

As the examples also show, the compositions of the present invention provide enhanced adhesion to both polar and non-polar substrates. They can be applied to various areas, such as adhesives, tie layers, and the like. The examples are directed to the bonding of paper cardboard for packaging hot melt adhesive (HMA) applications. As above, the inventive formulations were prepared by blending component 1, the aPP-iPP polymer and a functionalized polyolefin (such as MA-srPP with other ingredients, such as tackifier, wax, antioxidant, plasticizer oil, liquid resin tackifier, and the like) under low or high shear mixing at elevated temperatures to form a fluid melt. Mixing temperatures varied from about 130° C. to about 190° C.

The invention claimed is:

1. An adhesive comprising:
   i) at least one functionalized component chosen from functionalized polymers, functionalized oligomers and beta nucleating agents; and
   ii) an olefin polymer comprising 50 wt % or more of an alpha-olefin having 3 to 30 carbon atoms, where the olefin polymer has a Dot T-Peel of 1 N or more on Kraft paper, an Mw of 10,000 to 100,000, a g' measured at the Mz of 0.95 or less, a heat of fusion of 1 to 70 J/g, a heptane insoluble fraction of 70 wt % or less, based upon the weight of the starting olefin polymer.

2. The adhesive of claim 1, wherein the heptane insoluble fraction has a branching index g' of 0.9 or less as measured at the Mz of the polymer.

3. The adhesive of claim 1, wherein the heptane insoluble fraction has a branching index g' of 0.7 or less as measured at the Mz of the polymer.

4. The adhesive of claim 1, wherein the olefin polymer has a percent crystallinity of between 5 and 40% or less.

5. The adhesive of claim 1, wherein the olefin polymer has heat of fusion of from 20 to 70 J/g.

6. The adhesive of claim 1, wherein the olefin polymer has heat of fusion of from 30 to 60 J/g.

7. The adhesive of claim 1, wherein the olefin polymer has a percent crystallinity of 10-30%.

8. The adhesive of claim 1, wherein the olefin polymer has tensile strength at break of 0.75 MPa or more.

9. The adhesive of claim 1, wherein the olefin polymer has a Dot T-Peel of between 3 and 10,000 N.

10. The adhesive of claim 1, wherein the olefin polymer has a Tg of between 5 and −65° C.

11. The adhesive of claim 1, wherein the olefin polymer comprises at least 50 wt % propylene and up to 50 wt % of a comonomer chosen from butene and hexene.

12. The adhesive of claim 1, wherein tackifier is present at 1 to 60 wt %.

13. The adhesive of claim 1, wherein the olefin polymer has a Tg of 0° C. or less.

14. The adhesive of claim 1, wherein the olefin polymer has a melt index of 50 dg/min or more.

15. The adhesive of claim 1, wherein the functionalized component is present at 0.1 to 10 wt %.

16. The adhesive of claim 1, wherein the functionalized component comprises functionalized polymer.

17. The adhesive of claim 1, wherein the functionalized component comprises functionalized polymer selected from the group consisting of maleated polyethylene, maleated metallocene polyethylene, maleated metallocene polypropylene, maleated ethylene propylene rubber, and functionalized polyisobutylene.

18. The adhesive of claim 1, wherein the functionalized component comprises functionalized oligomer.

19. The adhesive of claim 1, wherein the functional component comprises a functional group selected from the group consisting of maleic anhydride, citraconic anhydride, 2-methyl maleic anhydride, 2-chloromaleic anhydride, 2,3-dimethylmaleic anhydride, bicyclo [2,2,1]-5-heptene-2,3-dicarboxylic anhydride and 4-methyl-4-cyclohexene-1, 2dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro (4.4)non-7-ene, bicyclo (2.2.1)hept- 5- ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x -methyl-bicyclo (2.2.1)hept-5-ene-2,3- dicarboxylic acid anhydride (XMNA).

20. The adhesive of claim 1, wherein the functional component comprises a functional polymer where the polymer of the functional polymer is polypropylene having a weight average molecular weight of 15,000 or less and a crystallinity of 5% or more.

* * * * *